United States Patent
Ribo

(10) Patent No.: US 6,378,317 B1
(45) Date of Patent: Apr. 30, 2002

(54) AIR-CONDITIONING METHOD AND DEVICE

(76) Inventor: Robert Ribo, Domaine de l' Obit, 11400 Verdun en Lauragais (FR)

( * ) Notice: Subject to any disclaimer, the term of this patent is extended or adjusted under 35 U.S.C. 154(b) by 0 days.

(21) Appl. No.: 09/674,773

(22) PCT Filed: May 4, 1999

(86) PCT No.: PCT/FR99/01059

§ 371 Date: Nov. 6, 2000

§ 102(e) Date: Nov. 6, 2000

(87) PCT Pub. No.: WO99/57491

PCT Pub. Date: Nov. 11, 1999

(30) Foreign Application Priority Data

May 4, 1998 (FR) .............................................. 98 05616

(51) Int. Cl.[7] .............................................. F25D 17/04
(52) U.S. Cl. ........................ 62/186; 62/179; 236/1 B; 454/236
(58) Field of Search .......................... 62/186, 177, 178, 62/179; 236/1 B, 1 G; 454/229, 236

(56) References Cited

U.S. PATENT DOCUMENTS

| | | | |
|---|---|---|---|
| 4,942,921 A | 7/1990 | Haessig et al. ............... 165/16 |
| 5,179,524 A | * 1/1993 | Parker et al. ................ 364/505 |
| 5,344,069 A | * 9/1994 | Narikiyo ..................... 236/49.3 |
| 5,772,501 A | * 6/1998 | Merry et al. ................. 454/256 |
| 6,071,189 A | * 6/2000 | Blalock ....................... 454/236 |
| 6,272,880 B1 | * 8/2001 | Miki et al. ..................... 62/404 |

FOREIGN PATENT DOCUMENTS

| FR | 2 703 761 | 10/1994 |
|---|---|---|
| GB | 2 258 744 | 2/1993 |
| WO | WO 97/34112 | 9/1997 |

* cited by examiner

*Primary Examiner*—Denise L. Esquivel
*Assistant Examiner*—Marc Norman
(74) *Attorney, Agent, or Firm*—Young & Thompson

(57) ABSTRACT

The invention concerns a method and a device for variable flow heating for controlling ventilating fresh air room by room in a building. The invention is characterised in that said method provides sequential control of the air using a central management unit (48) programmed to be configured, either in a mode controlling the temperature levels in the main rooms (8) wherein it maintains the set temperature in said rooms and senses the possible complete closure of the (or all) the air outlets (5) supplying said main rooms, or at least if one of the main rooms is no longer supplied, in a mode controlling fresh air wherein it controls the opening of the air outlet(s) of each room not initially supplied during a time interval for making up for the lack of fresh air supply, and by closing the air outlets in all the other rooms during the same interval.

47 Claims, 17 Drawing Sheets

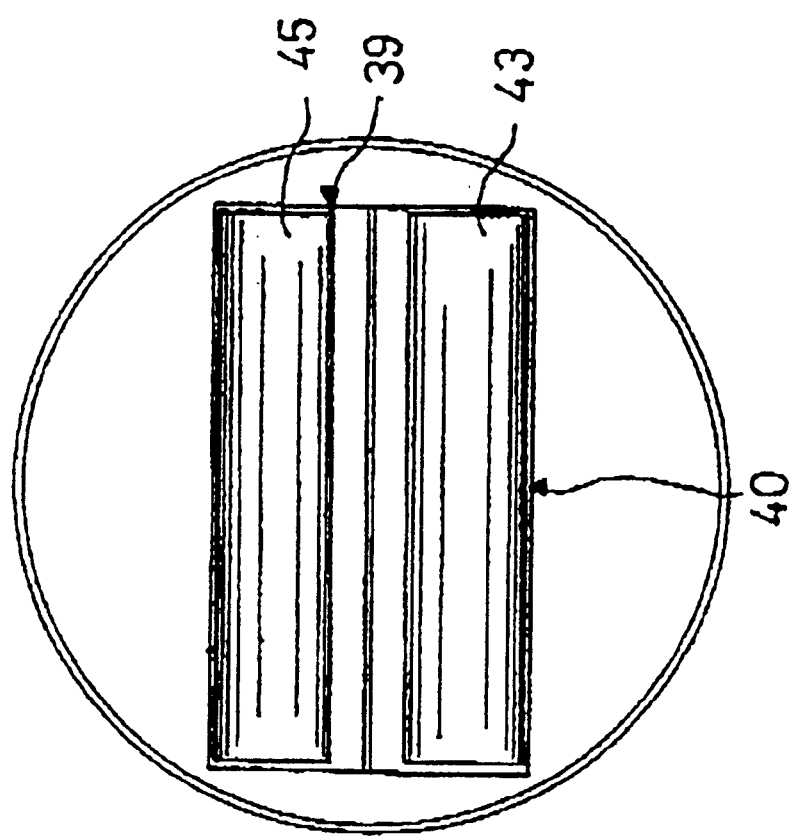
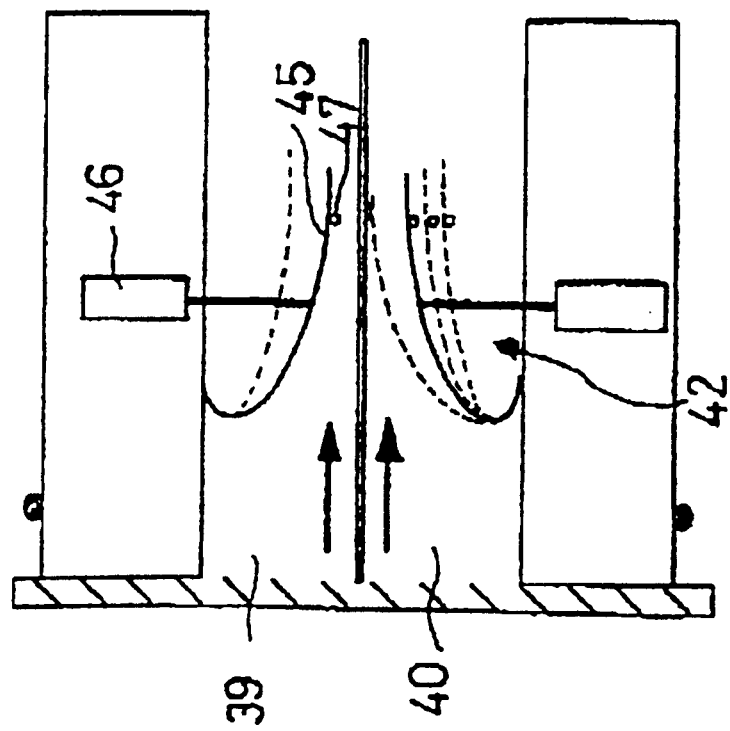
Fig 7b
Fig 7a

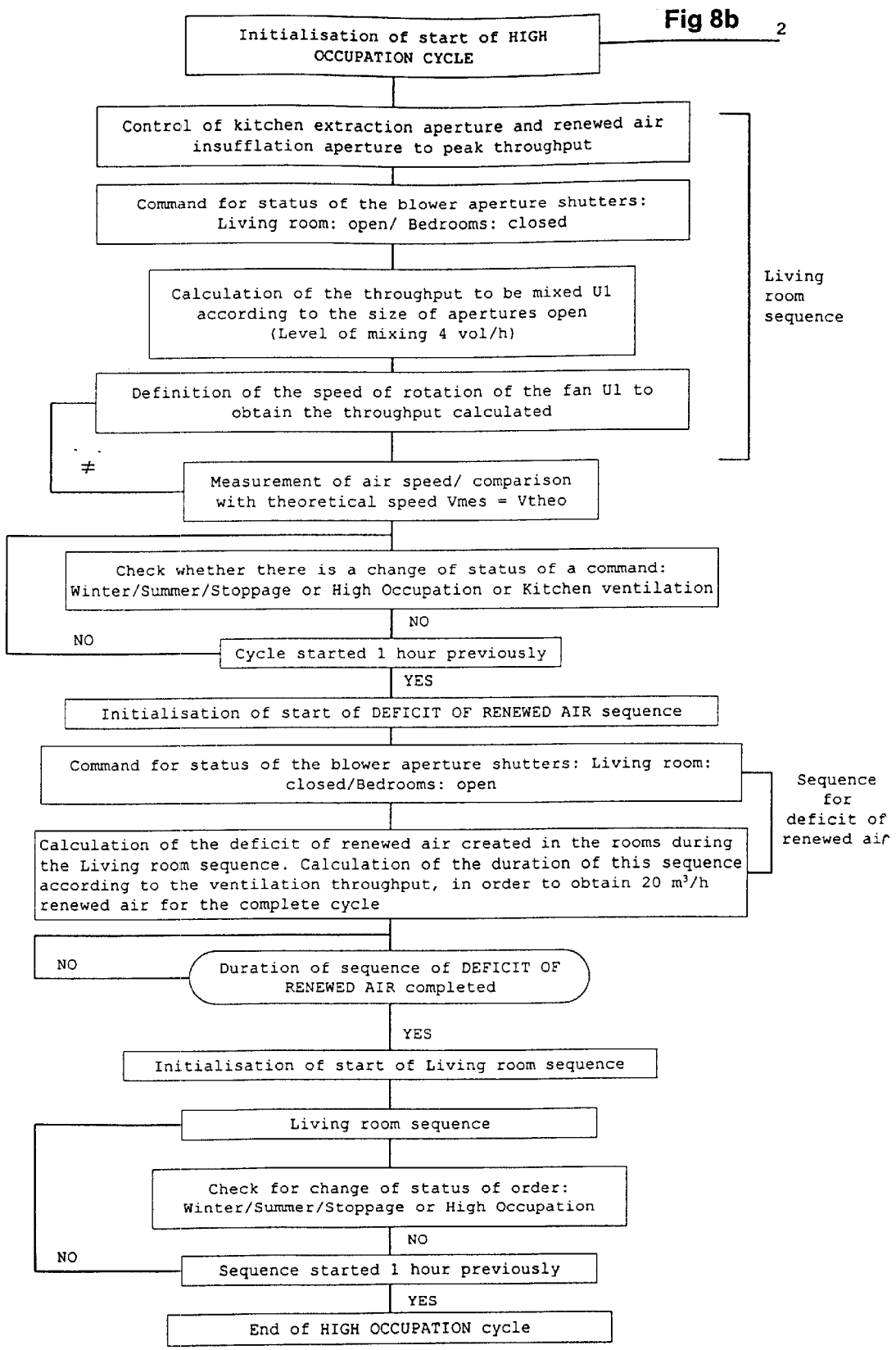

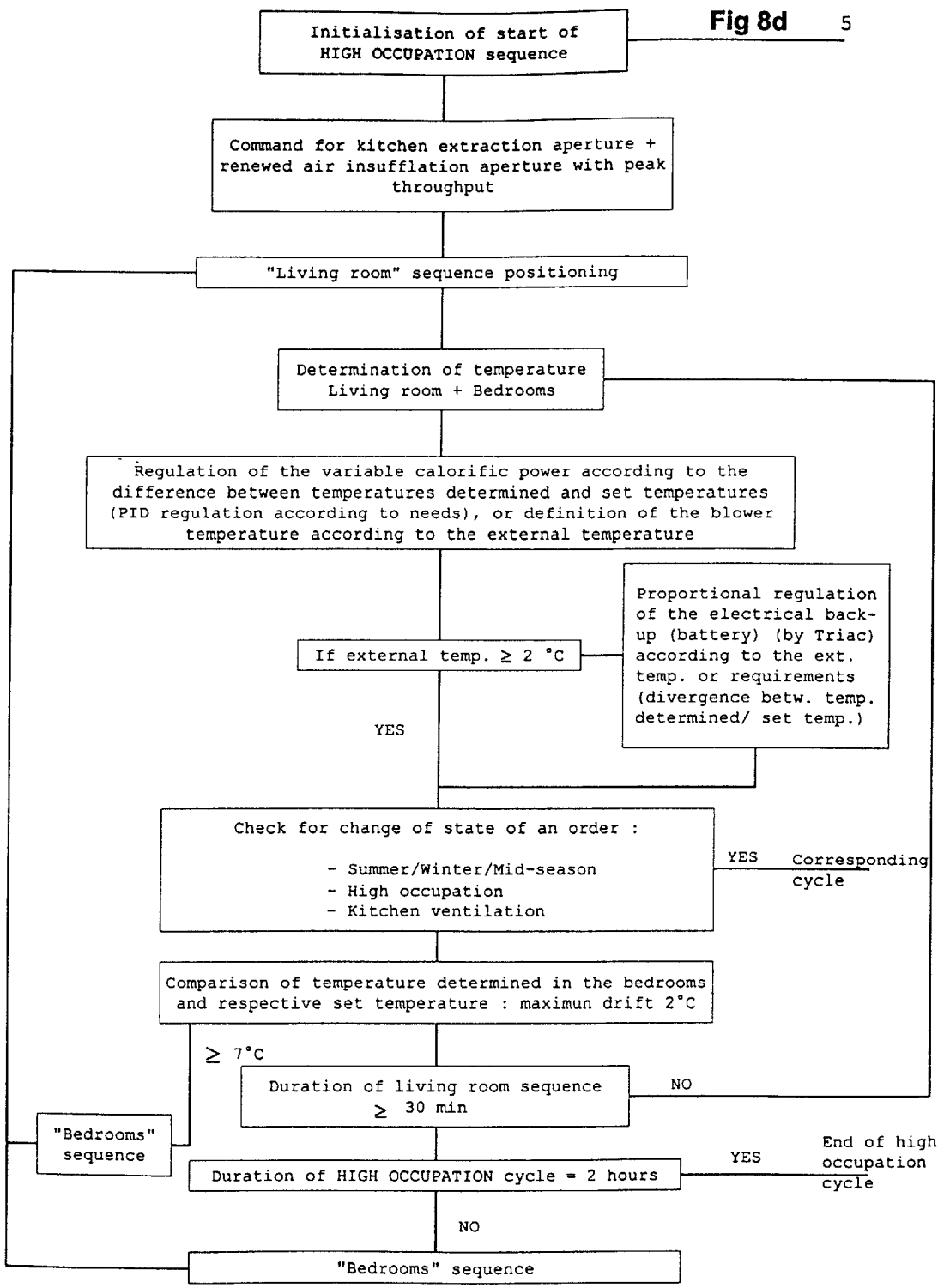

"Bedrooms - Deficit of renewed air" sequence

"Living room" sequence

REDUCTION/OPTIMISATION OF THE THROUGHPUTS OF RENEWED AIR
(Check carried out every 5 minutes)

AIR-CONDITIONING METHOD AND DEVICE

FIELD OF THE INVENTION

The invention relates to a method and a device for air conditioning and/or heating of premises, comprising at least one service room (kitchen, bathroom, toilet, etc.), and at least two main rooms (living room, drawing room, bedroom, hall, office etc.). It also extends to heating and/or air conditioning of buildings comprising several premises, and in particular housing blocks, tertiary accommodation premises (hotels, retirement homes), office blocks, etc.

This invention also relates specifically to a method and a device for air conditioning and/or heating, which, in addition to this heating and/or air conditioning, makes it possible to control in all seasons the supplies of renewed air required according to the regulations in force.

BACKGROUND OF THE INVENTION

At present, the simplest conventional ventilation solution which is designed to permit statutory supply of renewed air into premises, consists of providing air intake apertures on the facade in the main rooms, and extraction apertures in the service rooms. However, this solution is inefficient, and in particular can lead to discomfort and detrimental pollution and/or acoustic effects, in noisy and/or polluted environments.

For these reasons, the only solution which is actually proposed at present consists of using double-flow systems (extraction in the service rooms, and insufflation in the main rooms). However, this solution has a high cost price, owing to the need to increase the number of blower columns. In addition, according to this technique, it is difficult to modulate the throughputs blown into the main rooms, in accordance with the needs for supply of renewed air to the said rooms.

When the premises are equipped with a heating and/or air-conditioning device, management of control of the ventilation air to be supplied room by room also constitutes a delicate problem, which has not been solved hitherto. In fact, at present, it is physically impossible to distribute the throughput of renewed air equally room by room. In addition, stoppage of the heating and/or air-conditioning device by means for regulation, in particular in mid-season, or closure of one or more blower apertures, lead to interruption of any renewal of air in all the rooms or in the room(s) concerned. Thus, no heating and/or air-conditioning device at present which has a variable throughput is capable of assuring control, room by room, both of heating air and renewed air.

SUMMARY OF THE INVENTION

The object of the present invention is to eliminate this disadvantage, and its main objective is to provide a method and a device for heating and/or air conditioning, which additionally makes it possible to assure control of renewed ventilation air, room by room, in accordance with the regulations in force.

Another objective of the invention is to make it possible to modulate the throughputs of renewed air in accordance with the throughputs of air extracted.

Another objective of the invention is to make it possible to increase the renewal of renewed air in a room, when the latter is very crowded or smoky, without a deficit in the supply of renewed air in the other rooms.

Another objective of the invention is to make it possible to control the supply of renewed air in accordance with the external ambient pollution and the level of occupation of the premises.

For this purpose, the primary object of the invention is a method for heating and/or air conditioning of premises, comprising at least one service room, and at least two main rooms, consisting of:

using an external unit and at least one internal unit, the external unit comprising means for regulation with variable power and an exchanger, and each internal unit comprising an air take-up unit, means for ventilation with a variable power throughput and an exchanger, and being designed to assure the heating and/or air conditioning of at least two main rooms;

discharging a given volume of stagnant air from each service room;

conveying a given volume of renewed air to the air take-up units of each internal unit;

mixing the renewed air and the air taken up in each internal unit, upstream from the exchanger of the latter;

blowing the mixture of renewed air/heated and/or cooled air taken up, into each main room, through at least one blower aperture which is supplied by an internal unit, and each of which is associated with means for motorisation, which can make it possible to modify the position of opening of the said apertures; and regulating the temperature in each main room, by means of temperature measurement means, with which the means for motorisation of the blower apertures are associated, such as to obtain positioning of each of these apertures which can make it possible to maintain each of the said main rooms at a pre-determined set temperature.

According to the invention, this method is wherein a central control unit is used, which is associated with the external and internal units, the means for motorization of each blower aperture, and the means for measurement of the temperature, and is programmed to be configured:

either in a mode for control of the temperatures of the main rooms, during which:

it controls the external and internal units and the means for motorisation of the blower apertures, according to the information received from the means for measurement of the temperature, such as to maintain the set temperature in each main room;

it determines the position of the means for motorisation of each blower aperture, such as to detect any total closure of the (or all of the) aperture(s) which supply/supplies a main room;

and, if all the apertures which supply at least one main room are closed, it is configured in a mode for control of renewed air, during which:

it measures the time of closure of the said aperture(s) closed;

after a time of closure of the said aperture(s), which is greater than a pre-determined threshold, it calculates the deficit in the supply of renewed air in each room not supplied, and controls the means for motorisation of all the blower apertures, such as to open each blower aperture initially closed, and to close the initially opened blower apertures of the rooms, for a period of time which is designed to make up for the deficit in the supply of renewed air in each room not initially supplied; and it is reconfigured in the temperature control mode in the main rooms, when the deficit in the supply of renewed air has been made up.

According to the invention, when a method of this type has been perfected and set up, firstly it can be utilised with all methods of heating and/or air conditions used at present, which comprise a centralised blower unit, with regulation room by room, i.e. in particular:

the method described in patent FR-2 703 761 in the name of Mr RIBO; and the conventional methods which use at least one internal unit and one external unit, consisting either of:

a power unit with variable heating and cooling, which is associated with a blower throughput modulated in accordance with the needs of the premises treated;

a centralised chilled water production unit (which is reversible or is associated with independent heat production), which supplies a convector fan in each apartment, or a system for processing air by areas;

an air processing system with a variable throughput;

a unit of the V.C.T. type (variable coolant throughput); or a monoblock unit, for example of the air/air conditioning equipment type, installed in the roof.

According to the invention, the renewal of air is controlled by a sequential function, which, when a (or the) aperture(s) which supply a main room close(s) under the effect of the means for measurement of the temperature, and thus when the quantity of renewed air introduced into the room in question becomes too low, makes it possible to compensate in a very short time for the deficit of renewed air in this room, according to the following process:

1) If all the main apertures are open (general demand for heating or cooling). The renewed air is distributed equally in each main room, in accordance with the nominal throughput of the main apertures.

2) If one or more apertures are closed: the central control unit analyses the time during which each aperture has remained closed, and after a period of time which is determined by the said unit, commands closure of the apertures previously open, and opening of each aperture previously closed, such as to introduce into the rooms concerned a throughput of renewed air which is equivalent to the supply of renewed air during closure of the apertures.

Sequential functioning of this type makes it possible to assure control of renewal of air room by room, constantly and irrespective of the season, in conformity with the legislation in force, i.e. it makes it possible to introduce the renewed air into the premises in all the main rooms, according to the need of each of the said rooms.

(It should be noted that in the present application, the term "blower aperture" denotes either conventional apertures with motorisation at the rear of the said apertures, or motorised shutters which are disposed upstream from a blower grate fitted onto a casing. In addition, the term "discharge of stagnant air" denotes either systems which consist of injecting the renewed air into the main rooms, such as to lead to pressurisation of the latter, which causes discharge of the stagnant air through any suitable aperture, or, more conventionally, mechanical or manual extraction systems. For the sake of simplification, the term "discharge" will also be replaced by the term "extraction" in most of the text of this application).

According to a preferred embodiment, in its renewed air control configuration, the general control unit is programmed to control the external unit and/or the internal units, such that the temperature of the mixed air blown is close to the set temperature of each room initially closed. This therefore prevents disruption of the ambient temperature of the room(s) concerned.

According to another characteristic of the invention:

use is made of blower apertures provided with a main blower pipe, comprising a closing shutter controlled by means for motorisation, and an additional pipe with a reduced cross-section; and in the configuration for controlling the temperature of the main rooms, of the main control unit, and on the assumption that all the blower apertures are closed, air is distributed equally in all the main rooms, by means of the additional pipes of the blower apertures.

On the assumption that all the main apertures are closed (set temperature reached in all the rooms), the renewed air is thus distributed equally, owing to the additional pipe of the main apertures, the dimensions of which are also such as to maintain the range of the jet, so as to avoid any discomfort, and to maintain the sweeping of the room.

In addition, and advantageously, when all the blower apertures are closed, the main control unit controls the means for ventilation of each internal unit, such that the latter provide a minimal throughput of mixture of renewed/air taken up, by means of the additional pipe of the blower apertures.

In addition, when all the main apertures are closed, the central control unit is also advantageously programmed such that the temperature of the mixed air blown is close to the set temperature of the main rooms.

According to another characteristic of the invention, each additional pipe of each blower aperture is equipped with an automatically adjustable modulator, which can supply the same throughput of mixed air for a given range of pressures, and thus prevent any risk of discomfort.

In addition, each blower aperture is advantageously equipped with a temperature sensor, which acts as a means for measuring the temperature, is pre-assembled to the said blower aperture, and is disposed such as to be swept by the ambient air of the room. The addition to each blower aperture of a temperature sensor makes it unnecessary to have to install a thermostat in each main room, and therefore reduces the cost of equipment and labour.

According to another characteristic of the invention, the stagnant air is extracted from the service rooms by means of extraction apertures which are connected to pipes in which low pressure is created by a fan.

In addition, at least one of these extraction apertures, and in particular the one which is located in the kitchen, is equipped with a manually-controlled throughput modulator, which in particular makes it possible to modulate the throughput extracted, according to the occupation and/or use of the room concerned.

In addition, advantageously, in each slot of the blower apertures, there is integrated a flap which is articulated around a transverse axis, and can oscillate freely from a position of total or partial closure of the said slot, towards a position of total opening of the said slot, according to the air pressure upstream from the latter.

The function of a flap of this type is to limit the throughput of leakage supplied by the slots when the apertures are closed, since, when at least one blower aperture is open in the premises, the air pressure upstream from the closed apertures which are equipped with the said flap is then insufficient to open the latter.

Consequently, if one or more apertures are closed, and one or more apertures are open, the slot of the closed apertures does not allow to pass through a throughput of leakage which can modify the ambient temperature in the rooms of which the apertures are closed.

The renewed air is advantageously introduced into the premises by means of a pipe which is provided with a fan, and this renewed air is supplied to each internal unit by means of pipes, each of which comprises an insufflation aperture with a throughput which can be modulated, thus making it possible to adapt the throughput of renewed air according to the throughput of air extracted.

In addition, in order to adapt the throughput of renewed air of the insufflation apertures to the throughput of air extracted, the central control unit is advantageously connected to each extraction aperture with a throughput which can be modulated, and to each of the said apertures for insufflation of renewed air.

According to another characteristic of the invention, the intake of the pipe for supplying renewed air is equipped with a filtering system, according to the ambient external pollution. The renewed air is thus filtered before being introduced into the premises.

In addition, according to a preferred embodiment:
  there is provided in the premises at least one sensor to measure the quality of the air in the said premises, such as in particular a humidity sensor, a carbon dioxide sensor, etc.;
  the device is equipped with an external sensor to measure values corresponding to those of an internal sensor, i.e. in particular a humidity sensor, a carbon dioxide sensor, etc.;
  the general control system is connected to each measuring sensor and to the external sensor, and the latter is programmed such as to optimise the throughput of renewed air which is actually necessary for the premises.

In the method according to the invention, it is therefore possible to regulate the throughputs of extraction, and insufflation of renewed air, according to the information transmitted by the external and internal sensor(s). The renewal of air is therefore optimised according to the actual needs in the dwelling. In fact, measurement of the comparative quality of the external air and the internal air makes it possible in particular to determine the level of occupation of the area, and therefore the throughput of renewed air necessary.

Thus, by way of example, if humidity sensors are used, the method consists of:
  measuring the external humidity;
  calculating the internal humidity corresponding to the set temperature in the main rooms, on the assumption that there is a lack of production of vapour in the said main rooms, and therefore there are no occupants present;
  measuring the actual humidity in the main rooms; and
  according to these various measurements and calculations, modulating the throughput of renewed air, according to the divergence obtained, which is representative of the level of occupation of the premises.

According to the invention, two advantageous solutions can be envisaged for optimisation of the throughput of renewed air.

According to a first solution, the premises are equipped with a single measuring sensor, the central control unit being programmed, according to the information supplied by the said sensor, to regulate the throughput extracted and the throughput of renewed air insufflated.

The central sensor then measures the average quality of the air in the premises, and, according to the information provided by this sensor, the central control unit then adapts the throughput of air extracted (extraction apertures with a throughput which can be modulated) and the throughput of renewed air (renewed air insufflation apertures).

According to another solution:
  each blower aperture is equipped with a measuring sensor; and
  the central control unit is programmed such as to optimise the throughput of air extracted and the throughput of air insufflated at each internal unit, according to:
    the position of the closing shutter of the blower aperture(s) of each room; and
    the information supplied by each sensor, which is representative of the level of pollution (or occupation) determined by each sensor which "measures" the level of pollution of the room concerned, and therefore its need for renewed air.

According to this solution, the central control unit then optimises the throughputs of renewed and extracted air according to the condition of opening of each blower aperture, and the information supplied by each sensor which "measures" the level of pollution of the room concerned, and therefore its need for renewed air.

In addition, for one or the other of the above solutions, the central control unit can advantageously be programmed to limit the throughput of renewed air to a minimal value, if the external pollution becomes higher than the internal pollution, such as to restrict these throughputs of renewed air to pre-defined limit values.

According to another characteristic of the invention, the central control unit is designed to be able to be positioned in a control mode which is known as "smoky", or "high level of occupation of one of the main rooms, known as the "living room"", during which:
  it is initially configured in a sequence known as "living room";
    at the beginning of which it commands opening of the blower aperture(s) of the living room, and closure of the blower apertures of all the other main rooms;
    it calculates a given maximal mixing throughput in the living room, and controls the internal unit of the said living room such as to obtain this level of mixing;
    it adapts the thermal power supplied by the internal unit, such as to obtain the set temperature in the living room;
  after a pre-determined period of time, it is configured in a sequence known as "bedrooms", in which;
    it commands closure of the blower aperture(s) of the living room, and opening of the blower apertures of the other main rooms known as bedrooms;
    it calculates the deficit of renewed air in the bedrooms during the living room sequence, and commands maintenance of this "bedroom" sequence for a period of time which is designed to make up for the said deficit of renewed air; and
    it is repositioned in its "living room" configuration, after this period of time has elapsed.

(It will be appreciated that a main room known as a "living room" means either the actual living room, or any of the other main rooms (office, bedroom etc), at the choice of the occupants).

This characteristic makes it possible to minimise the transfer of pollution from a room which is highly occupied and/or smoky, such as the living room, to the other main rooms, without leading to a deficit in the supply of renewed air in the said other main rooms.

In addition, during this "smoky", or "high level of occupation of the living room" control mode, as well as in normal sequential functioning, the main control system is programmed to position each extraction aperture and each insufflation aperture in the maximal throughput mode.

This arrangement is aimed firstly at optimising the sequences of deficit of supply of renewed air, and secondly at assuring substantial ventilation of the room which is highly occupied or smoky.

In addition, and advantageously, during the "smoky", or "high level of occupation of the living room" control mode, the "bedrooms" sequence is triggered, either after the pre-determined period of time, or if the divergence between the actual temperature in one of the bedrooms and the set temperature of the said bedroom becomes greater than a given value. This arrangement makes it possible to avoid excessive cooling of bedrooms which may be occupied.

According to another characteristic of the invention, the central control unit is programmed to analyse the development of the temperatures in each main room, relative to the respective set temperatures, in order to command closure of the blower aperture(s) of one of the main rooms, in the event of abnormal variation of temperature in the said room, and in order to emit an alarm-signal which is representative of this closure.

In fact, this function makes it possible to detect two abnormal phenomena, i.e.:
    maintenance of a window in the open position during the period of heating or air conditioning; and
    dysfunctioning of a motorised blower aperture.

This therefore prevents losses of energy, in particular if a window is open, and, moreover, the user is warned of the dysfunctioning, and can eliminate it.

According to another characteristic of the invention, in the air-conditioning mode, the central control unit is programmed to command extraction and insufflation of the maximal throughput of stagnant and renewed air, when the external temperature becomes lower than the set temperatures.

In addition, use is advantageously made of a heat exchanger for renewed air/extracted air, which is designed to assure pre-heating or pre-cooling of the renewed air.

According to another characteristic of the invention, the central control unit comprises manual controls, which can allow the user to pre-define a plurality of functioning characteristics such as:
    definition of at least two types of set temperatures for each main room, such as comfort temperature or reduced temperature; and
    definition daily or weekly, and in hourly steps, of the set temperature for each main room, such as anti-frost temperature, comfort temperature, reduced temperature etc.

The above method can be used for heating and/or air conditioning of isolated premises, such as an individual house. It is however advantageously designed for the heating and/or air conditioning of several premises such as housing blocks, Offices, lodging rooms, etc.

In this case, in addition, each of the premises can be equipped with an external unit, or a centralised external unit can be used for all the premises. In addition, the term "premises" in this case means either a Conventional dwelling, or a series of offices in a block, or a group of hotel rooms, or the complete hotel itself.

The invention extends to a device for heating and/or air conditioning of premises comprising at least one service room and at least two main rooms, comprising:
    an external unit and at least one internal unit, the external unit comprising means for regulation with variable power and an exchanger, and each internal unit comprising an air take-up unit, means for ventilation which have variable throughput and power and an exchanger, and are designed to assure heating and/or air conditioning of at least two main rooms;
    means for discharge of stagnant air;
    means for introduction of renewed air at the take-up units of each internal unit;
    means for mixture of renewed air/air taken up in each internal unit, upstream from the exchanger of the latter;
    means for blowing the mixture of renewed air/air taken up present in each main room, in one or more blower apertures which are supplied by at least one internal unit, and each of which is associated with means for motorisation which can modify the position of opening of the said apertures; and
    means for measuring the temperature in each main room, with which there are associated the means for motorisation of the blower aperture(s) of the said main room, and which are designed to make it possible to obtain a set temperature in the said room.

According to the invention, this device for heating and/or air conditioning comprises a central control unit which is connected to the external unit, to each internal unit, and to the means for motorisation of the blower apertures, the said central control unit being programmed to:
    either be configured in a mode for controlling the temperatures of the main rooms, during which:
        it controls the external and internal unit(s) and the means for motorisation of the blower apertures, according to the information received from means for measuring the temperature, such as to maintain the set temperature in each main room; and
        it detects the position of the means for motorisation of each blower aperture, such as to detect any total closure of the (or all the) blower(s) which supply a main room;
    and, on the assumption that all the apertures which supply at least one main room are closed, it is configured in a mode for control of renewed air, during which:
        it measures the time of closure of the said closed aperture(s);
        beyond a time of closure of the said aperture(s) which is greater than a pre-determined threshold, it calculates the deficit in the supply of renewed air in each room which is not supplied, and controls the means for motorisation of all the blower apertures, such as to open each blower aperture initially closed, and to close the blower apertures initially opened of the other rooms, for a period of time which is designed to make up the deficit in renewed air supplied in each room not initially supplied; and
        it is reconfigured in a temperature control mode in the main rooms, when the deficit in the supply of renewed air has been made up.

In addition, the central control unit is advantageously programmed in its renewed air control configuration, in order to control the external and/or the internal unit(s) such that the temperature of the mixed air blown approaches the set temperature of each room initially closed.

According to another characteristic of the invention:
    each blower aperture comprises a main blower pipe, containing a closing shutter which is controlled by means for motorisation, and an associated pipe with a reduced cross-section;
    in its configuration for controlling the temperature, and on the assumption that all the blower apertures are closed, the central control unit is programmed to assure equal distribution of the air in all the rooms, by means of the additional pipes of the blower apertures.

In addition, the means for motorisation of the blower apertures are preferably designed to position the closing shutters in two positions, corresponding either to total closure, or to total or partial opening of the main pipes of the said apertures.

According to another characteristic of the invention, the additional pipe of each blower aperture is equipped with an automatically adjustable modulator, which can make it possible to supply the same throughput of air for a given range of pressures.

In addition, in its slot, each blower aperture preferably has a shutter which is articulated around a transverse axis, and can oscillate freely from a position of total or partial closure of the said slot, towards a position of total opening of the said slot, according to the air pressure upstream from the latter.

In addition, each blower aperture is advantageously equipped with a temperature sensor, which is pre-assembled to the said aperture, acts as a means for measuring the temperature, and is disposed such as to be swept by the ambient air of the room, when the said blower aperture has been installed (phenomenon of induction).

For each service room, the air extraction means advantageously comprise an extraction aperture which is connected to a main pipe, in which low pressure is created by means of a fan, at least one of the said extraction apertures preferably being provided with a device for manually-controlled modulation of throughput.

According to another characteristic of the invention, the means for introduction of renewed air comprise a pipe which is provided with a fan designed to supply this renewed air in each internal unit, at the level of an insufflation aperture with a throughput which can be modulated, such as to make it possible to adapt the throughput of renewed air to the throughput of air extracted.

The central control unit is then preferably connected to each extraction aperture with a throughput which can be modulated and to each aperture for insufflation of renewed air, and is then programmed to adjust the throughput of the said insufflation apertures, such as to adapt the throughput of renewed air according to the throughput of air extracted.

According to another characteristic of the invention, the device comprises a filtering system which is integrated in the pipe for supply of renewed air, according to the ambient external pollution.

In addition, this device advantageously comprises:
- at least one sensor to measure the quality of the air in the premises, such as in particular a humidity sensor, a carbon dioxide sensor, etc.;
- an external pollution sensor to measure values corresponding to those of an internal sensor, i.e. a humidity sensor, a carbon dioxide sensor, etc.;
- the general central control unit being connected to the various external and internal sensors, and being programmed to optimise the throughput of renewed air which is actually necessary.

In this case, and according to a first advantageous solution, this device comprises a single internal measuring sensor, the central control unit being programmed to regulate the throughput of air extracted and the throughput of renewed air, according to the information supplied by the said sensor.

Again in this case, and according to a second advantageous solution:
- each blower aperture is equipped with a measuring sensor;
- the central control unit is programmed such as to optimise the throughput of air extracted and the throughput of renewed air at each internal unit, according to:
  - the position of the closing shutter of the blower aperture(s) of each room; and
  - the information supplied by each sensor in the room concerned, which is representative of its need for renewed air.

According to another characteristic of the invention, the central control unit is designed such that it can be positioned in a control mode which is known as "smoky", or "high level of occupation of one of the main rooms", known as the "living room", during which:
- it is initially configured in a sequence known as "living room" at the beginning of which it commands opening of the blower aperture(s) of the living room, and closure of the blower apertures of all the other main rooms;
- it calculates a given maximal mixing throughput in the living room, and controls the internal unit of the said living room such as to obtain this level of mixing;
- it adapts the thermal power supplied by the internal unit, such as to obtain the set temperature in the living room;

after a pre-determined period of time, it is configured in a sequence known as "bedrooms", in which:
- it commands closure of the blower aperture(s) of the living room, and opening of the blower apertures of the other main rooms known as bedrooms;
- it calculates the deficit of renewed air in the bedrooms during the living room sequence, and commands maintenance of this "bedroom" sequence for a period of time which is designed to make up for the said calculated deficit of renewed air; and
- it is repositioned in its "living room" configuration, after this period of time has elapsed.

In addition, according to another characteristic of the invention, the central control unit is programmed to analyse the development of the temperatures in each main room, relative to the respective set temperatures, in order to command closure of the blower aperture(s) of one of the main rooms, in the event of abnormal variation of temperature in the said room, and in order to emit an alarm signal which is representative of this closure.

As previously stated, a heating and/or air conditioning device of this type can be used for individual premises, such as a house. It is however also designed for the heating and/or air conditioning of several premises such as housing blocks, offices, lodging rooms, etc, comprising either an external unit for each of the premises, or a centralised external unit.

BRIEF DESCRIPTION OF THE DRAWINGS

Other characteristics, objects and advantages of the invention will become apparent from the following detailed description, provided with reference to the attached drawings which show by way of non-limiting example two preferred embodiments of the invention, as well as two variants of blower apertures, and two variants of extraction apertures. In these drawings:

FIGS. 7a and 7b are respectively a schematic cross-section through a longitudinal axial plane, and a front view of a second variant of an extraction aperture according to the invention; and FIGS. 8a to 8k represent the algorithms of functioning of an installation according to the invention.

DETAILED DESCRIPTION OF THE INVENTION

Figure 1:
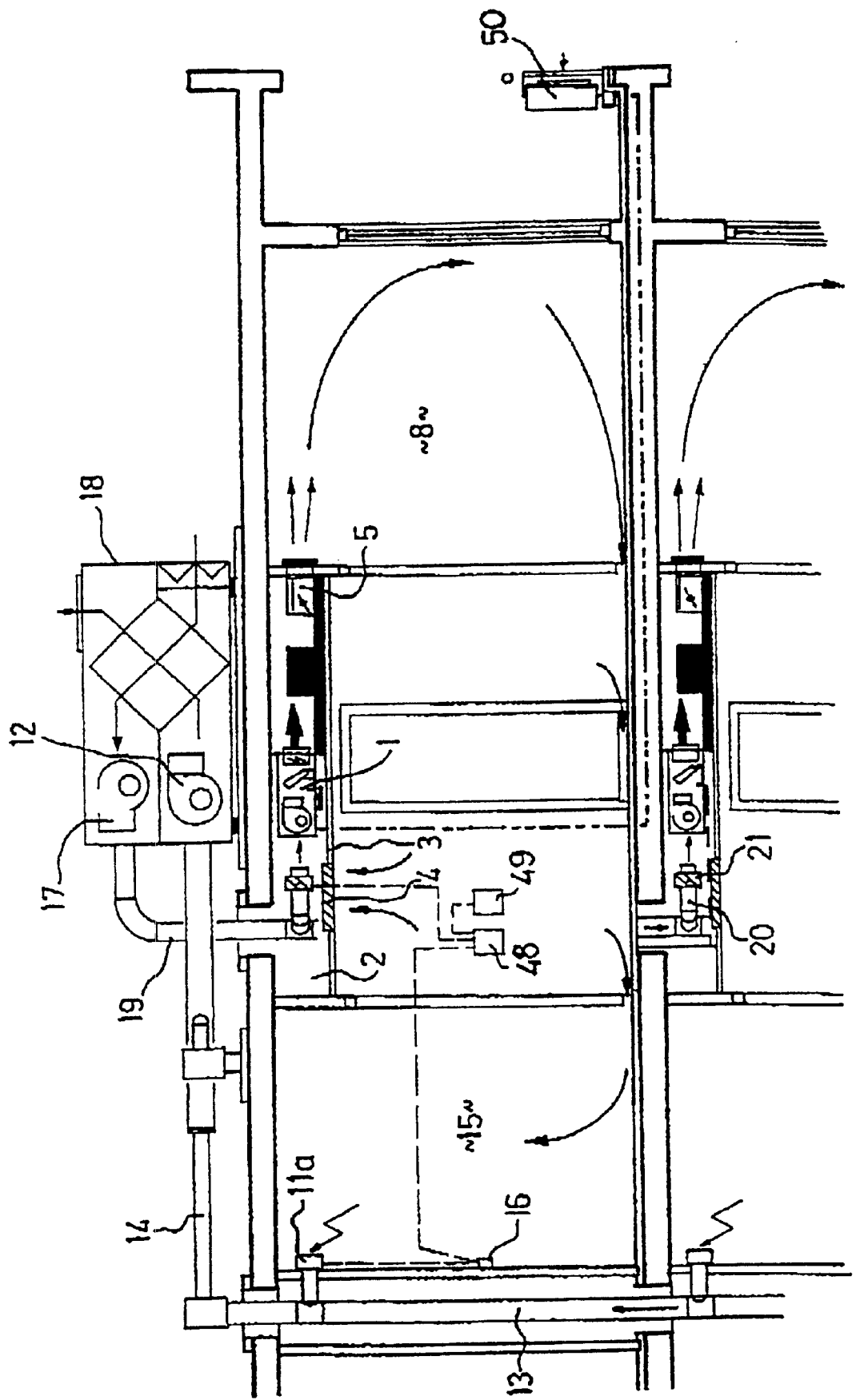
FIG. 1 is a partial vertical cross-section of a housing block, representing a dwelling on the top floor of the said block, equipped with a device for heating and/or air conditioning comprising one external unit per dwelling.
Figure 2:
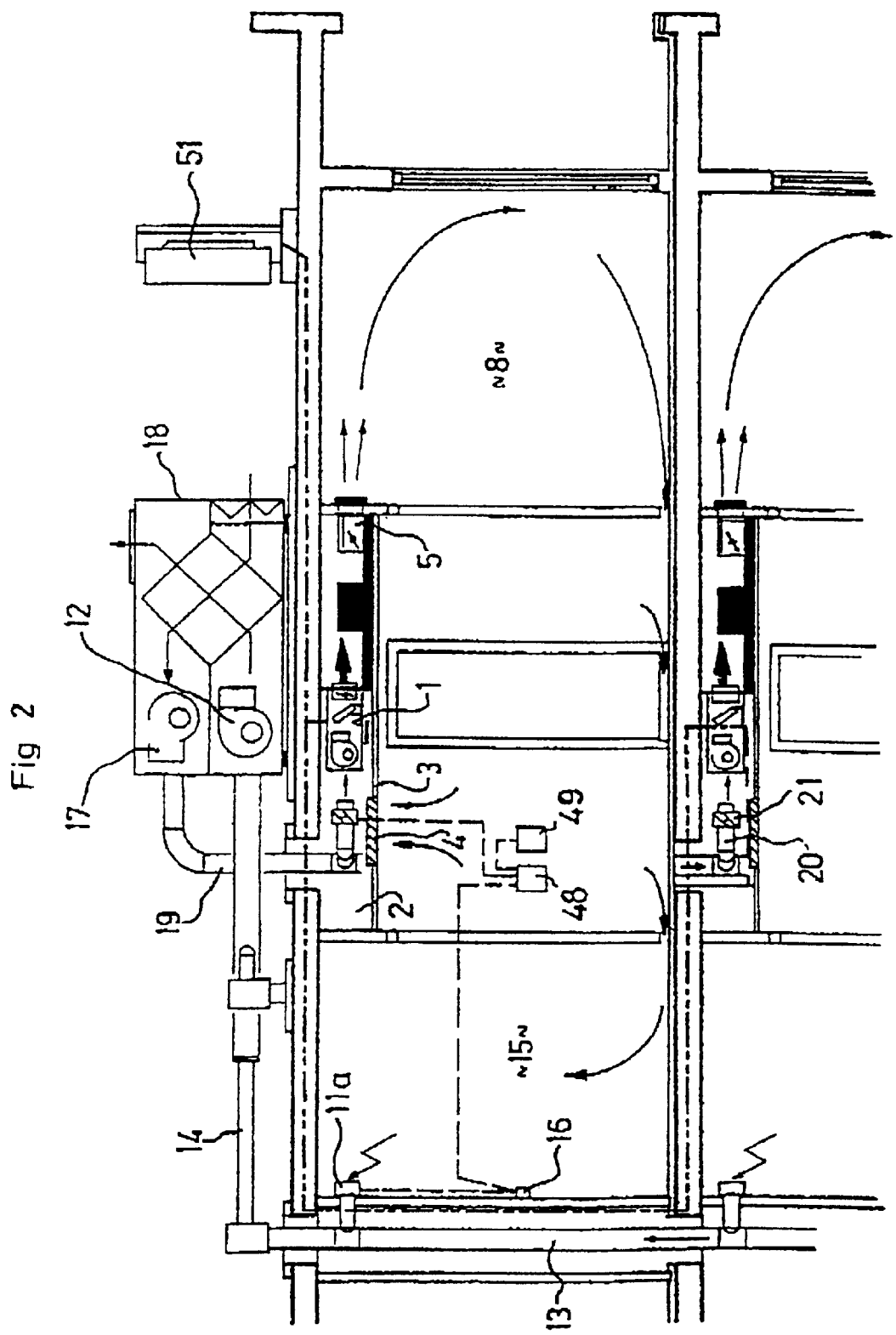
FIG. 2 is a cross-section similar to that in FIG. 1, according to which each dwelling is equipped with devices for heating and/or ventilation comprising a centralised external unit.
Figure 3:
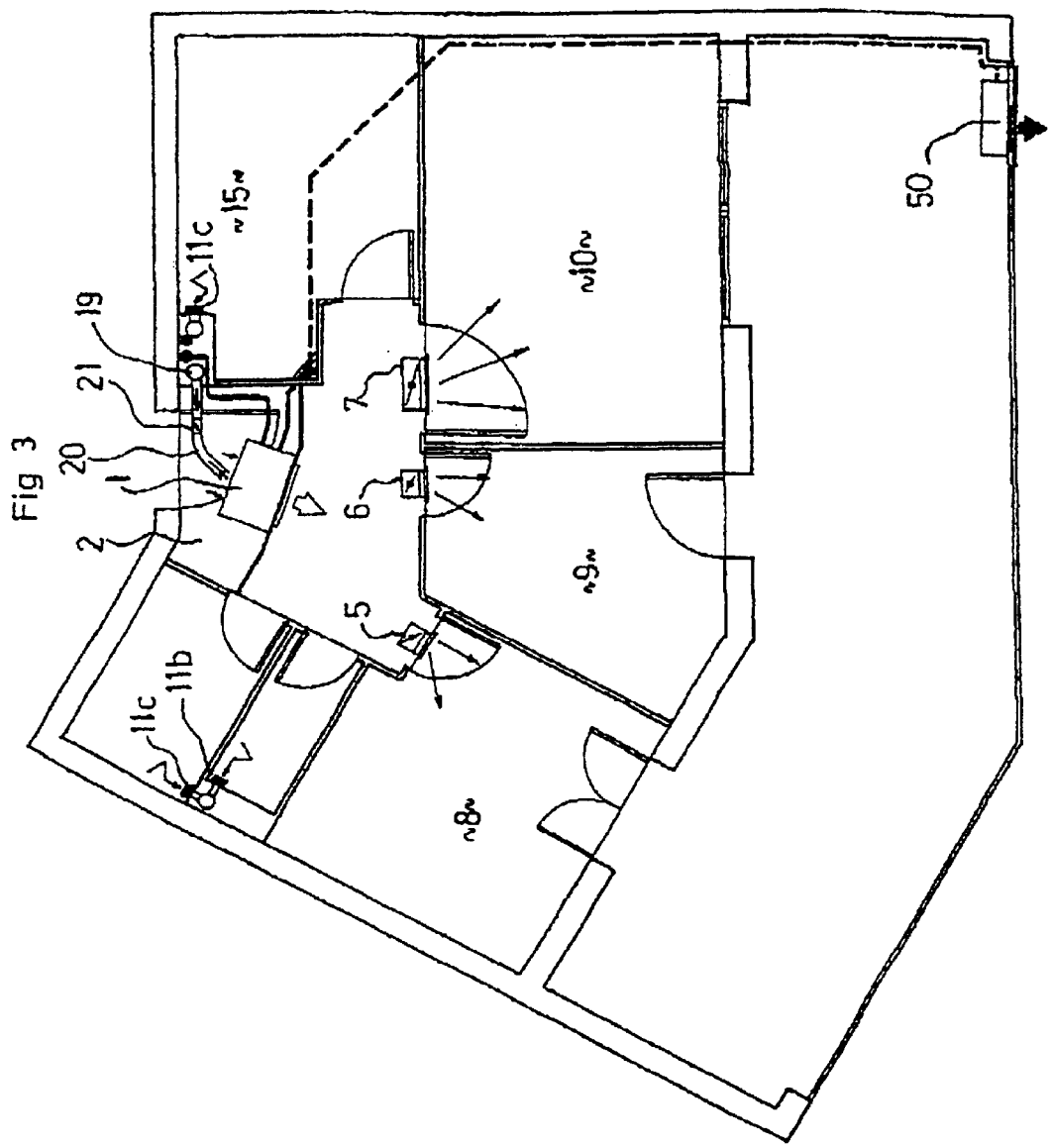
FIG. 3 is a plan view of a dwelling with a terrace, equipped with a device according to the invention, comprising an individual external unit.

The heating and/or air-conditioning installations represented in FIGS. 1 to 3 are derived from that described in patent FR-2 703 761, in that they each comprise an internal unit 1, disposed in a recovery plenum chamber 2 with a trap door, delimited by a false ceiling 3, and provided with a recovery grate 4 which is disposed in the said false ceiling, and blower grates such as 5, 6, 7 (shown in FIG. 3), for distribution of air into each of the main rooms, such as the bedrooms 8, 9 and the living room 10 (FIG. 3).

However, according to the invention, this installation differs from that described in the RIBO patent, firstly in that the individual (50 FIG. 1) and centralised (51 FIG. 2) internal and external units are production units with variable power.

In addition, all the blower apertures such as 5, 6, 7 are motorised apertures such as described hereinafter, which are designed to make it possible to vary the blower throughput in the rooms, from a maximal throughput (which is regulated during installation), to a greatly reduced leakage throughput (of approximately 15 to 20 m³/h).

Finally, and in particular, these installations differ from that described in the RIBO patent, in that they are designed to assure control of the renewal of renewed air in each main room 8, 9, 10 of the dwellings.

Firstly, these installations comprise a stagnant air extraction assembly, consisting of extraction apertures such as 11a, 11b, 11c, which are located in the service rooms (kitchen, bathroom, toilets etc.), and are connected to a fan 12 by a network of upright pipes such as 13, and horizontal pipes such as 14 located on the terrace.

These extraction apertures 11a, 11b, 11c make it possible to discharge the statutory throughputs imposed, and generally have a throughput which can be modulated for the kitchen 15 (see FIGS. 6a to 7b), and is fixed or can be modulated for the other service rooms.

For this purpose, the extraction aperture 11a with a throughput which can be modulated is conventionally associated with a switch 16, which makes it possible to select either a regular throughput or a peak throughput, according to the occupation and use of the kitchen 15.

This installation also comprises an assembly for introduction of renewed air, comprising firstly an integrated fan 17, such as the extraction fan 12, in a double-flow exchanger 18 which is located on the terrace, and makes it possible to pre-heat or pre-cool the renewed air.

This assembly for introduction of renewed air also comprises a descending column 19 for insufflation of renewed air, which is connected to the fan 17, and at the level of each dwelling has a horizontal branch 20 which opens into the plenum chamber 2, upstream from the internal unit 1, and on which there is fitted an insufflation aperture 21 with an air throughput which can be modulated.

It should be noted that as a variant, each dwelling can be equipped with a mini-fan, which is fitted onto a pipe, which opens respectively onto the facade and into the plenum chamber 2.

As previously stated, each blower aperture 5, 6, 7 is motorised, and comprises a main pipe 22, inside which there is disposed a motorised regulation shutter 23, which is fitted such as to rotate around an axial transverse axis 24, and can be displaced under the effect of means for motorisation (not shown), i.e.:

into a position of total closure of the main pipe 22, in which it abuts an annular peripheral seal 25, in order to close the said pipe in a sealed manner; and into a position of maximal opening of the main pipe 22, in which it extends in the horizontal plane of symmetry of the pipe 22.

Each of these blower apertures 5, 6, 7 also has in a conventional manner a double-deflection blower grate 26, and a counter-frame 27, which makes it possible to secure it in an aperture provided in a partition 28.

The first particular feature of these blower apertures 5, 6, 7 consists in the fact that, in parallel with the main pipe 22, they have an additional, leakage throughput pipe 29, constituting a slot which accommodates a module 30 for regulation of the said leakage throughput.

Inside this slot 29, and in order to regulate initially the leakage throughput, there is disposed a plate 31 in the shape of an obtuse dihedron, one of the surfaces 31a of which is secured to the peripheral frame of the blower aperture 5, and the other surface 31b of which is inclined towards the interior of the said slot. By means of this plate 31, pre-regulation of the leakage throughput can be carried out by means of a screw 32, which is supported on the surface 31b of the plate 31, and makes it possible to adjust the inclination of the latter, and therefore the cross-section of the slot 29.

The second particular feature of these apertures 5 consists in the fact that each slot 29 contains a shutter 52, which is articulated around a transverse axis, and can oscillate freely from a position of total or partial closure of the said slot 29, towards a position of total opening of the said slot, according to the air pressure upstream from the latter.

The third particular feature of these blower apertures 5, 6, 7 consists in the fact that they incorporate a temperature sensor, and optionally a hygrometry sensor, which makes it possible in particular to avoid installation of a thermostat in each room.

Figure 4:
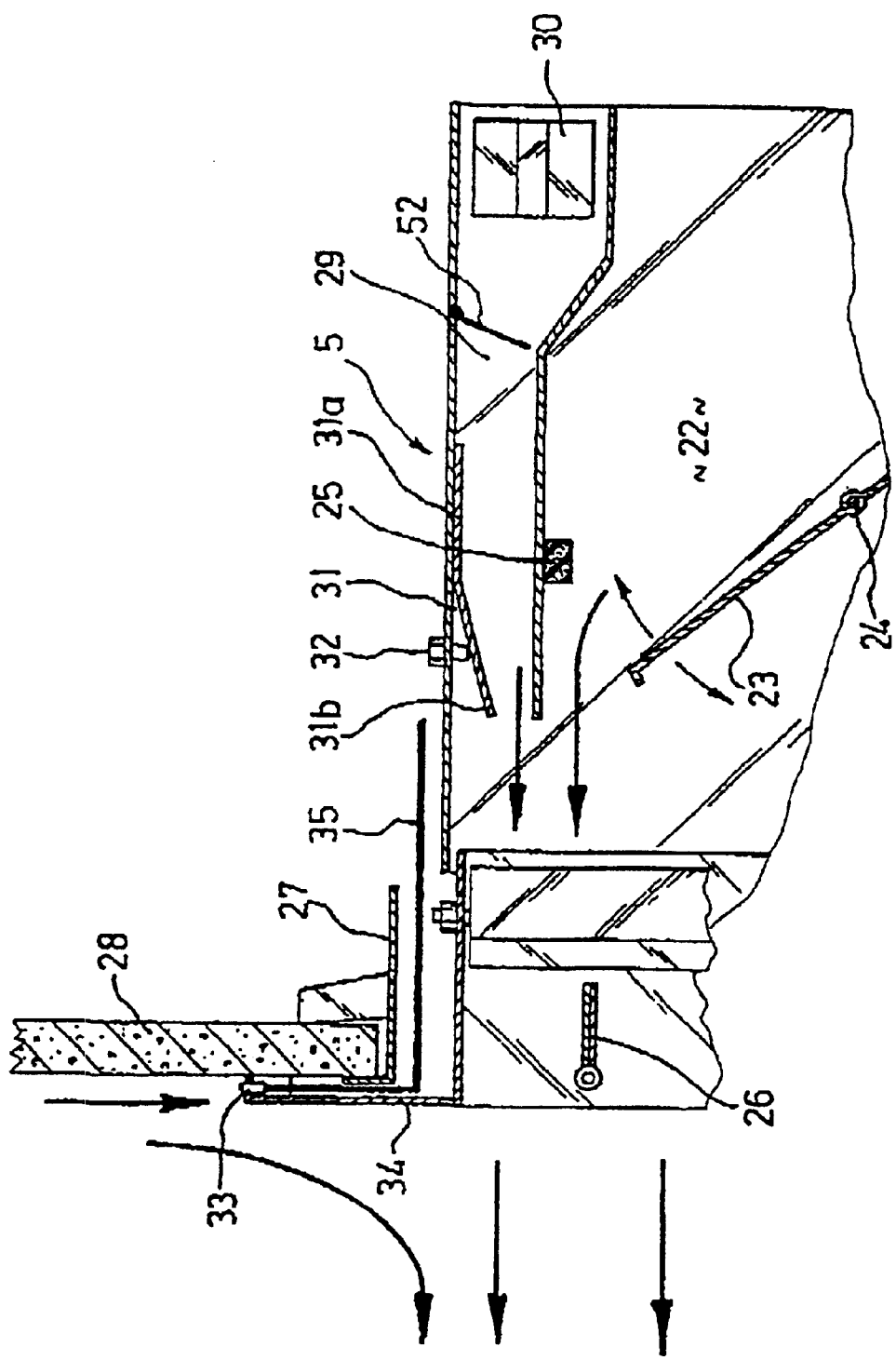
FIG. 4 is a partial cross-section through an axial vertical longitudinal plane of a first variant of a blower aperture according to the invention.

According to the first variant shown in FIG. 4, this sensor 33 is arranged such that it is disposed at the level of the end of an annular collar 34, bordering the end of the frame of the blower aperture 5, between the said collar and the outer surface of the partition 28.

As shown in FIG. 4, when thus positioned, this sensor 33 is swept by the ambient air entrained by the jet of air which is discharged from the blower aperture 5.

Figure 5:
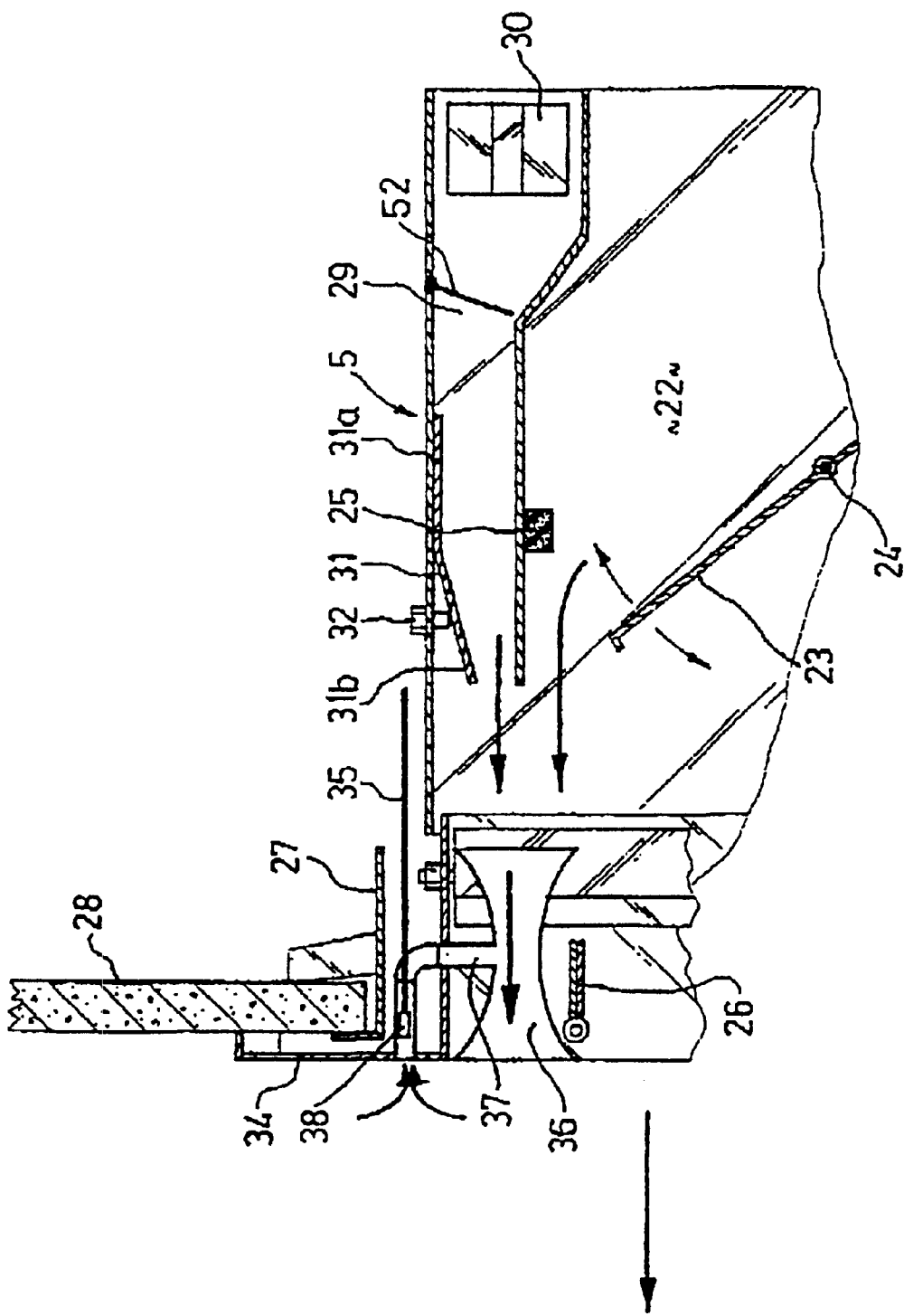
FIG. 5 is a partial cross-section through an axial vertical longitudinal plane of a second variant of a blower aperture according to the invention.

According to the second variant, shown in FIG. 5, the blower aperture 5 incorporates a Venturi system 36 (shown schematically), which is disposed at the outlet of the said aperture, in the common extension of the main pipe 22 and the additional pipe 29, and a pipe 37 in the shape of a right-angled bend, the vertical branch of which opens at the level of the neck of the Venturi system 36, and the horizontal branch of which extends in the direction of the interior of the room with which it communicates.

The temperature sensor 38 is disposed inside the horizontal branch of the pipe 37, such that the low pressure at the level of the neck of the Venturi system 36 sucks up the ambient air from the room which is swept by this sensor 38.

Finally, each of these sensors 33, 38 is connected to an electric wire 35, for connection to a central control unit described hereinafter, which is designed to carry out correction of the measurement of the temperature measured by the said sensors, such as to take into account the height above ground of the latter.

In addition, these blower apertures 5, 6, 7 have dimensions such that, in the totally open position of the main pipe 22, and for an air output speed of 2 to 2.5 m/s, this main pipe 22 has a loss of load of 3 to 6 Pascals, whereas the slot 29 has a loss of load which is far greater.

By way of example, for an aperture with a cross-section of 300 mm×100 mm, which is suitable for a bedroom of 11 m$^2$:

- the main pipe 22 has a cross-section with dimensions suitable for obtaining a throughput of 130 m$^3$/h with 5–6 Pa;
- the slot 29 has dimensions suitable for obtaining a throughput of 40 m$^3$/h with 20 Pa, with a cross-section with dimensions such that the speed is 2 to 2.5 m/s at the outlet. With 5 Pa, this slot 29 will allow a throughput of approximately 20 m$^3$/h to pass.

According to this principle, when no main room needs to be heated or cooled, the motorised shutters 23 are in the closed position. The central control unit described hereinafter reduces the speed of rotation of the fan of the internal unit 1, and therefore sets the throughput mixed by the latter to the following value, according to the type of dwelling:

| | T1 | T2 | T3 | T4 | T5 |
|---|---|---|---|---|---|
| Q mixed in m$^3$/h | 80 | 120 | 160 | 200 | 240 |

The automatically adjustable slots 29 thus assure that the plenum is pressurised (20 Pa). Thus, the throughput insufflated in each room is controlled (balancing of the ventilation network), and good distribution of the renewed air is assured. In addition, the speed of 2 to 2.5 m/s at the outlet of the slot 29 assures a correct range of the jet, and thus total sweeping of the room by the renewed air.

In addition, by way of example, in the living room 10, the blower aperture 7 has a slot 29, which has dimensions such as to obtain a throughput of 80 m$^3$/h with 20 Pa (modulus 80). In the other rooms (bedrooms, office), the slot 29 of the blower aperture 5, 6 has dimensions such as to obtain a throughput of 40 m$^3$/h with 20 Pa (modulus 40).

As previously stated, the extraction apertures 11a provided in the kitchens 15 have a throughput which can be modulated. As shown in FIGS. 6a, 6b, 7a and 7b, these extraction apertures each comprise two, superimposed longitudinal pipes 39, 40, the upper one 39 of which consists of a regular throughput pipe, and the other, lower one 40 of which consists of a peak throughput pipe.

In addition, two variants of extraction apertures are shown respectively in FIGS. 6a–6b and 7a–7b.

Figure 6B:
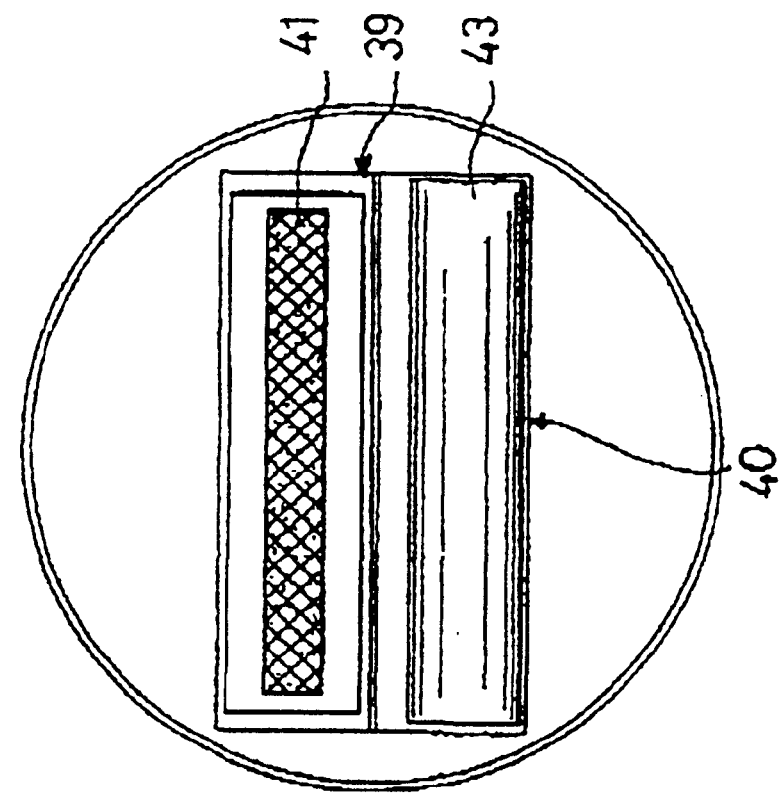
FIGS. 6a and 6b are respectively a schematic cross-section through a longitudinal axial plane, and a front view of a first variant of an extraction aperture according to the invention.
Figure 6A:
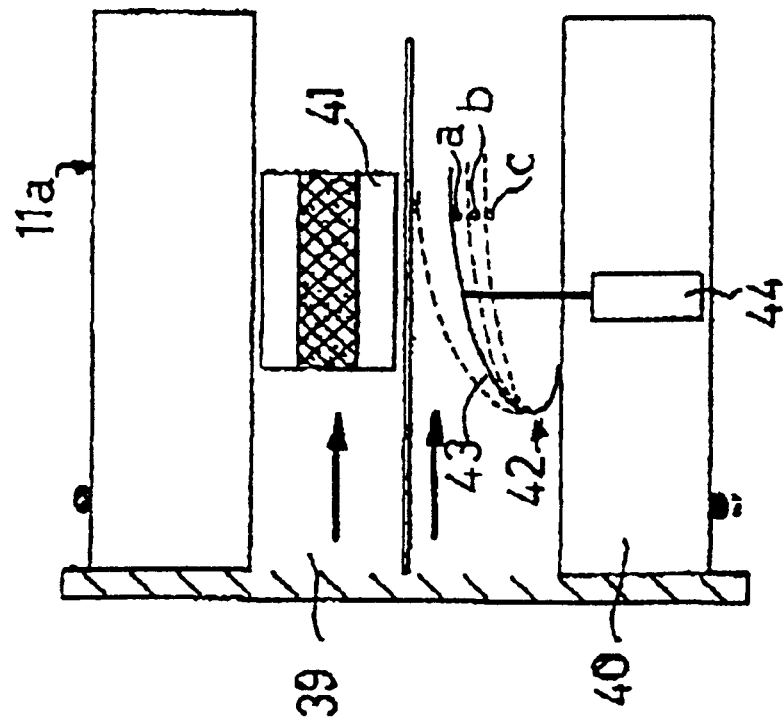
Figure 8A:
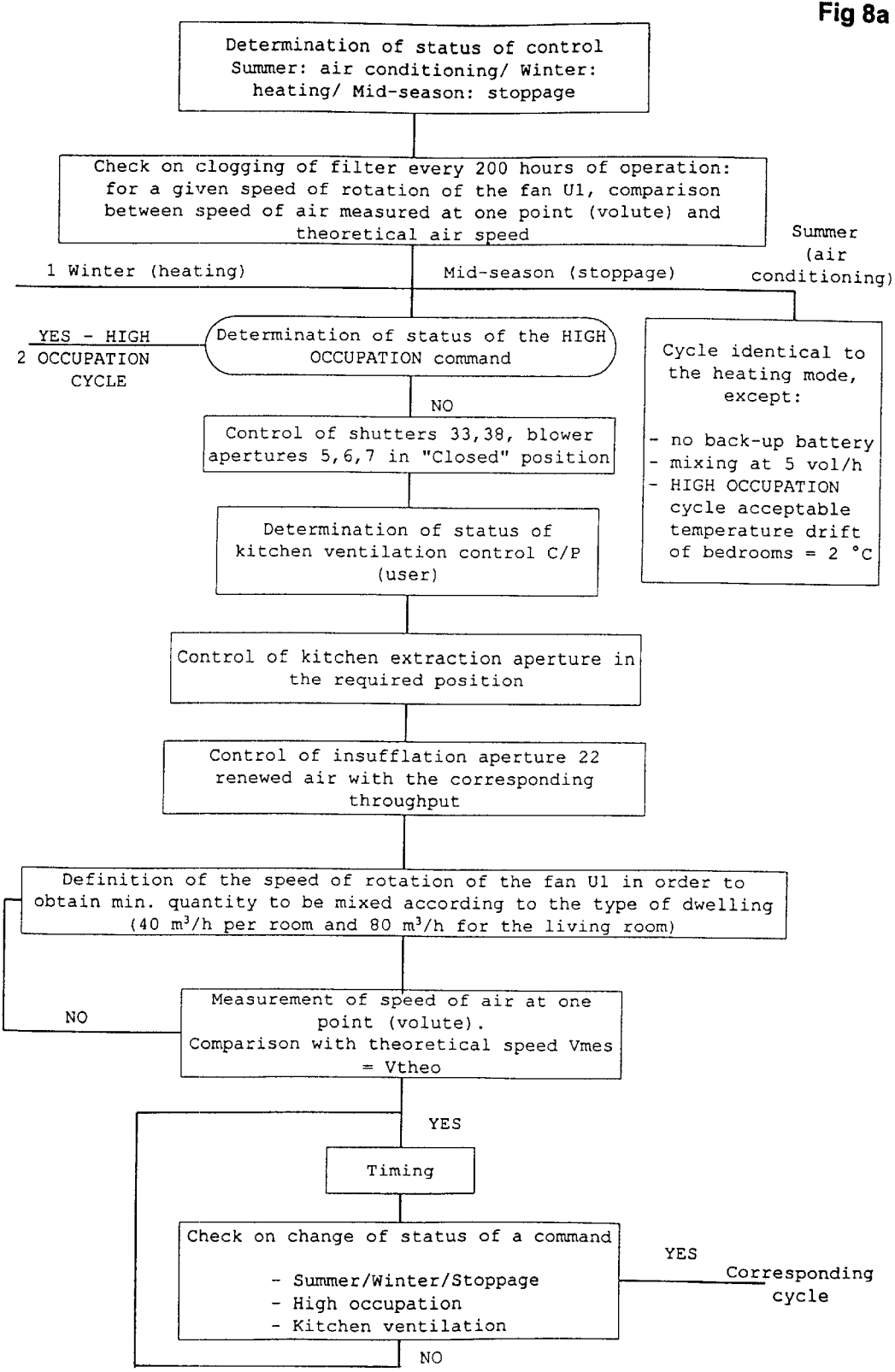
Figure 8C:
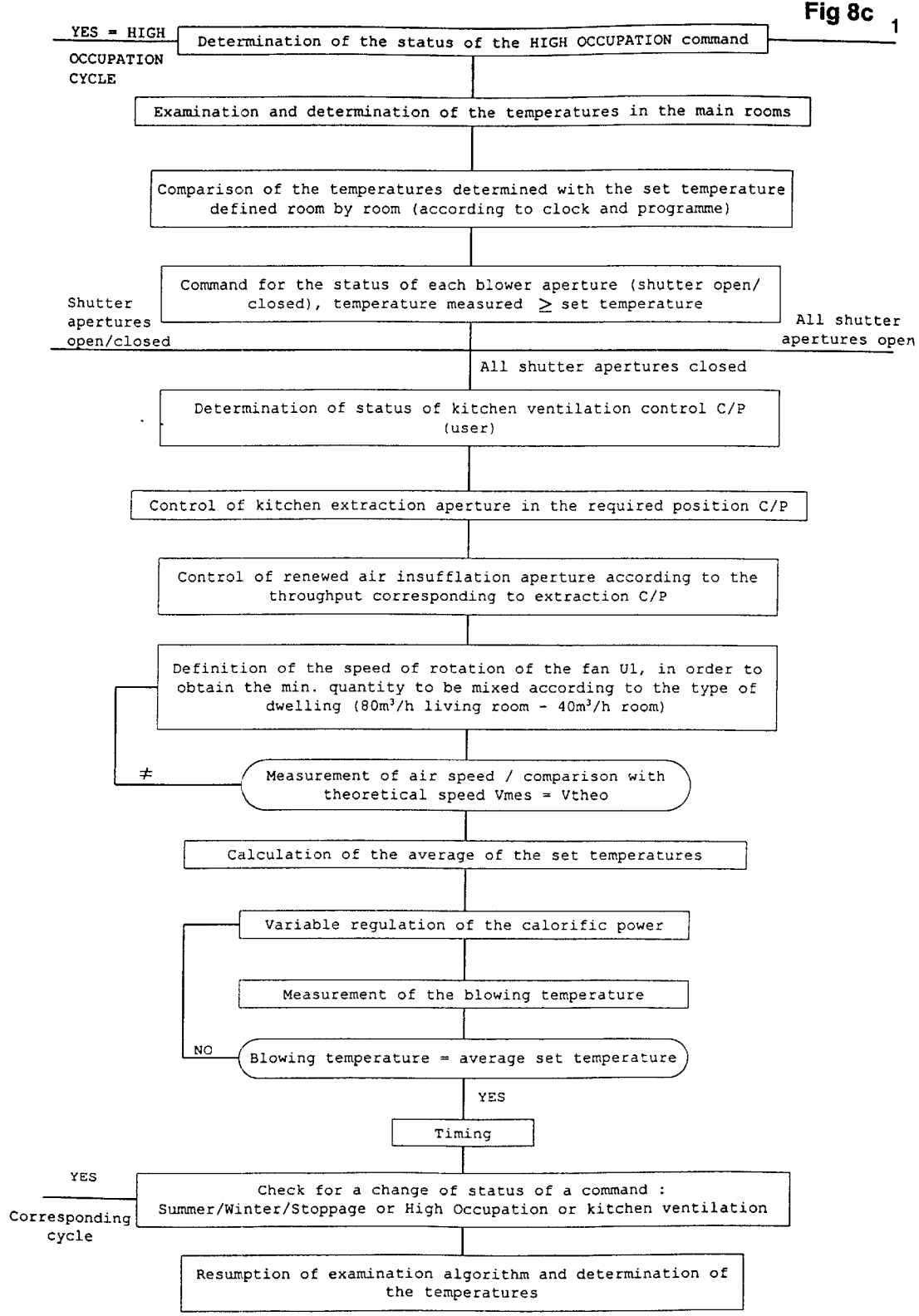
Figure 8F:
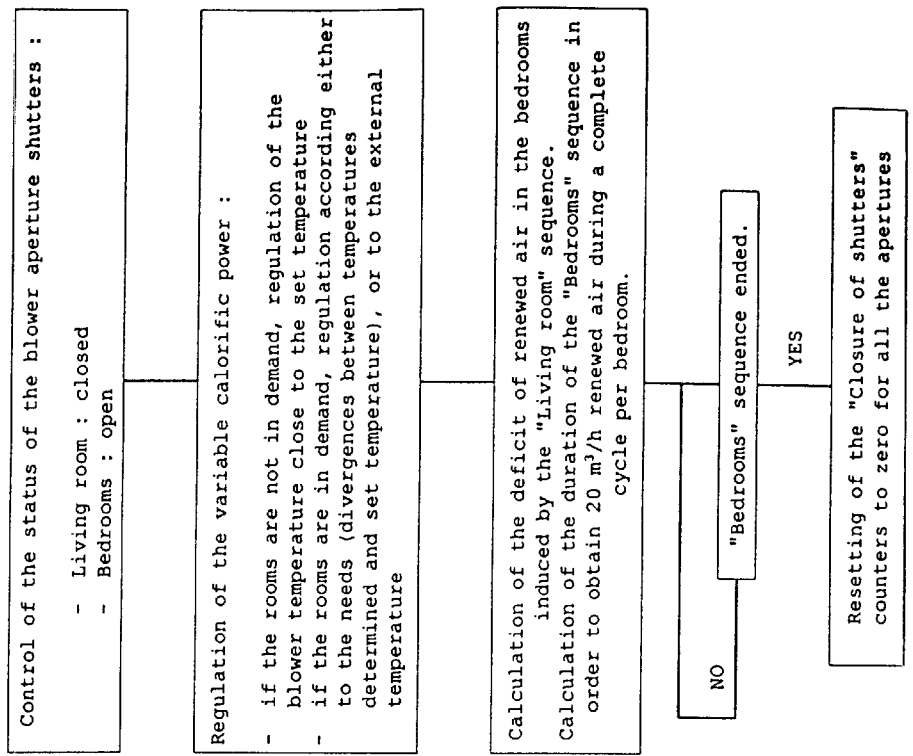
Figure 8E:
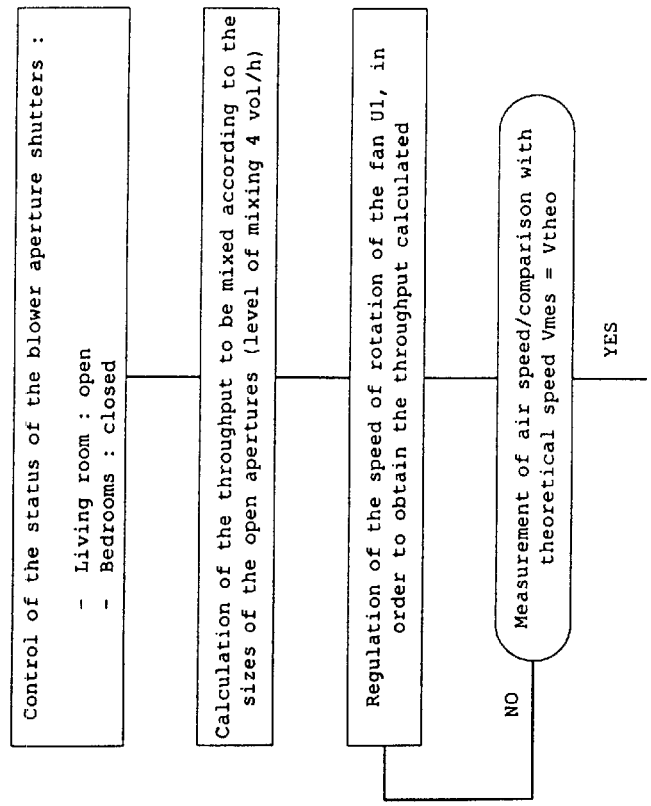
Figure 8G:
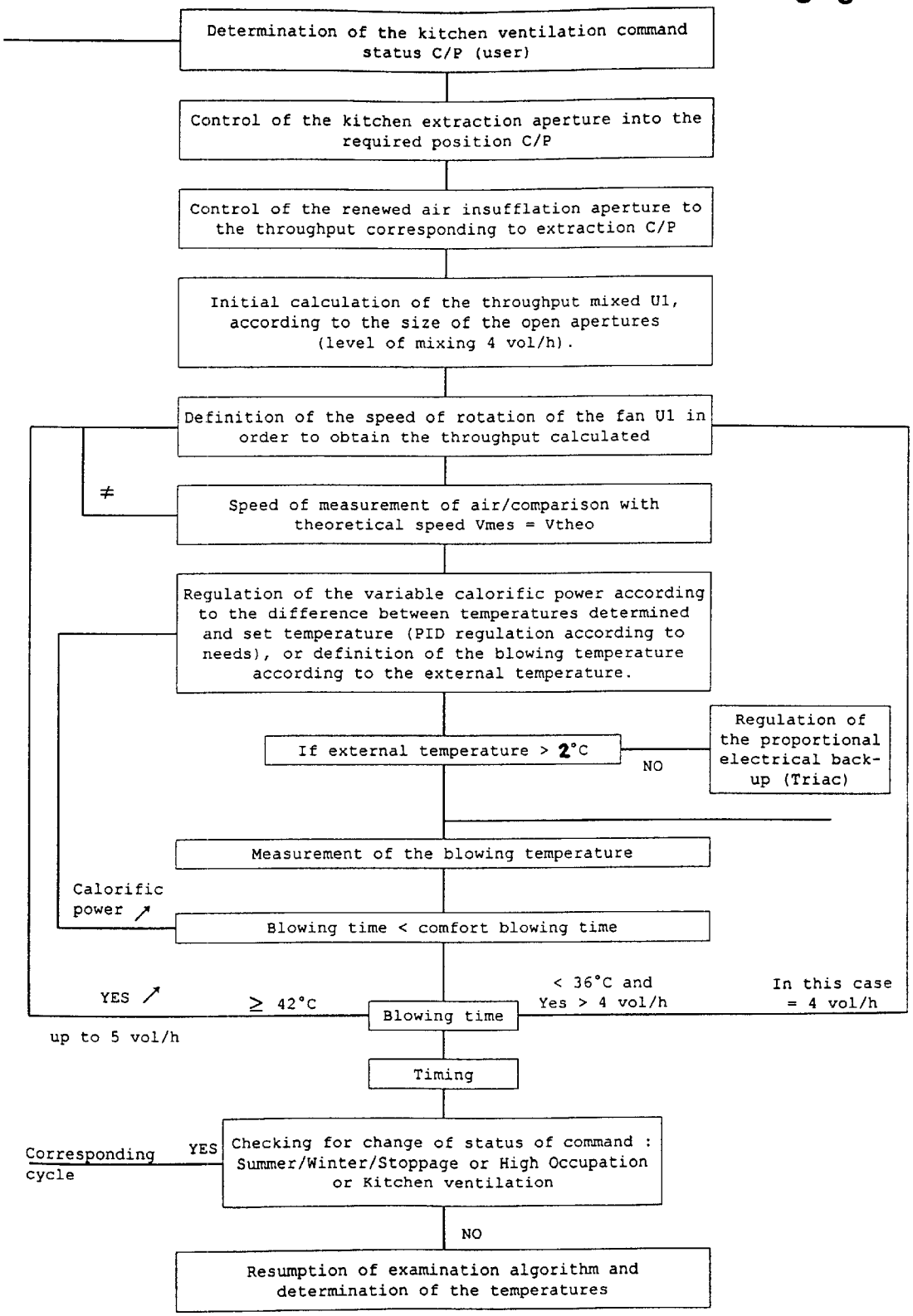
Figure 8H:
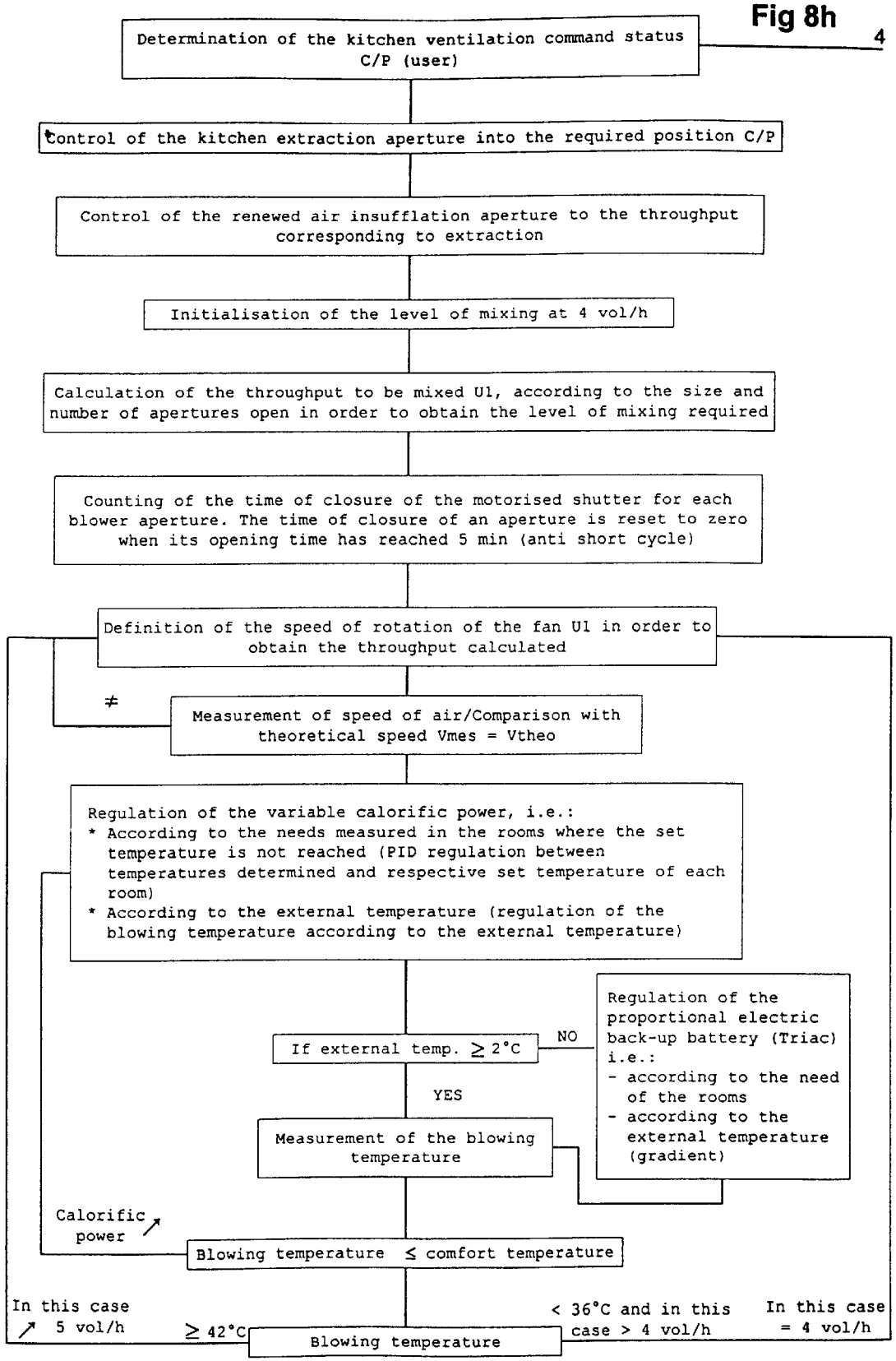
Figure 8I:
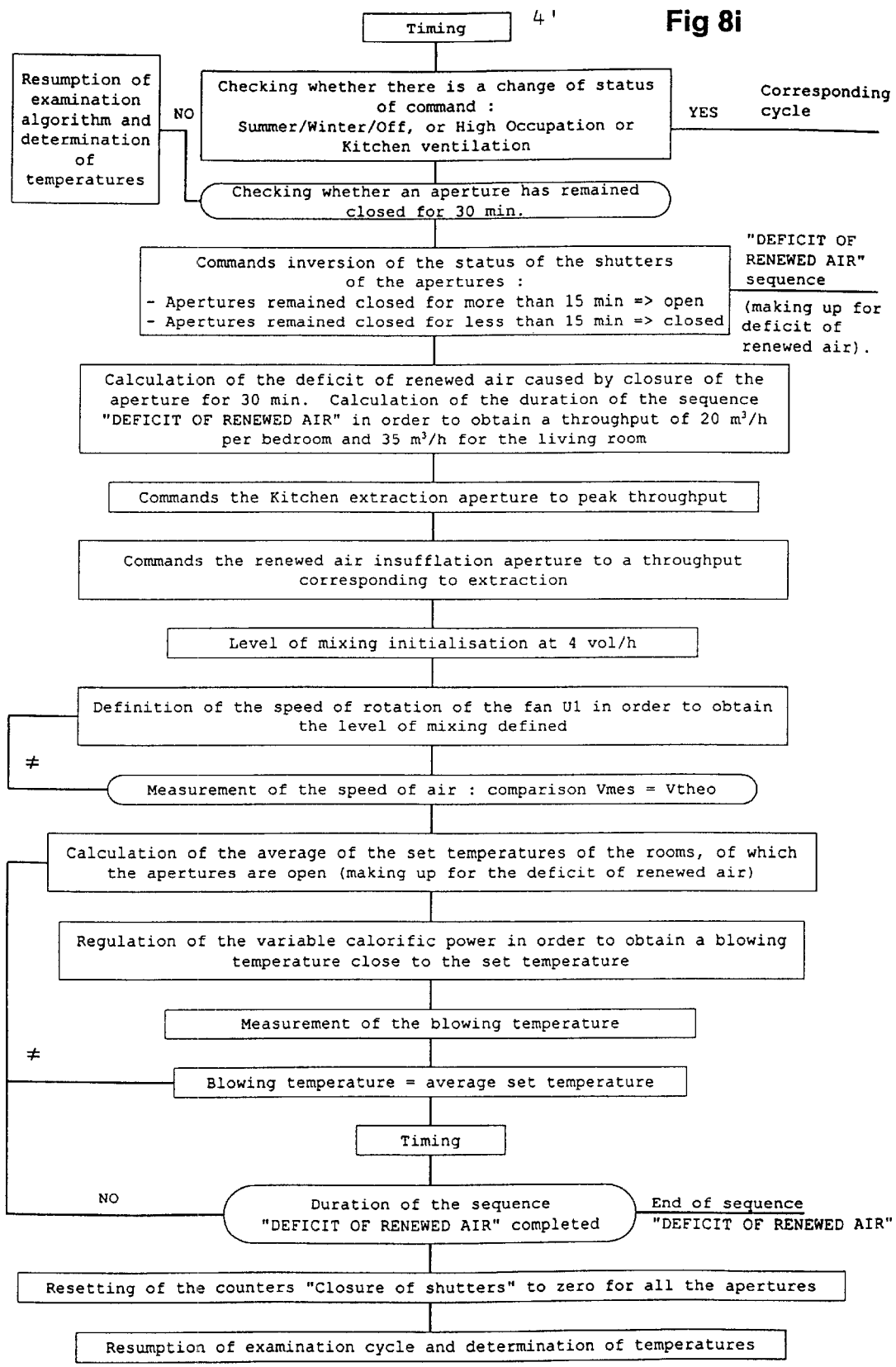
Figure 8J:
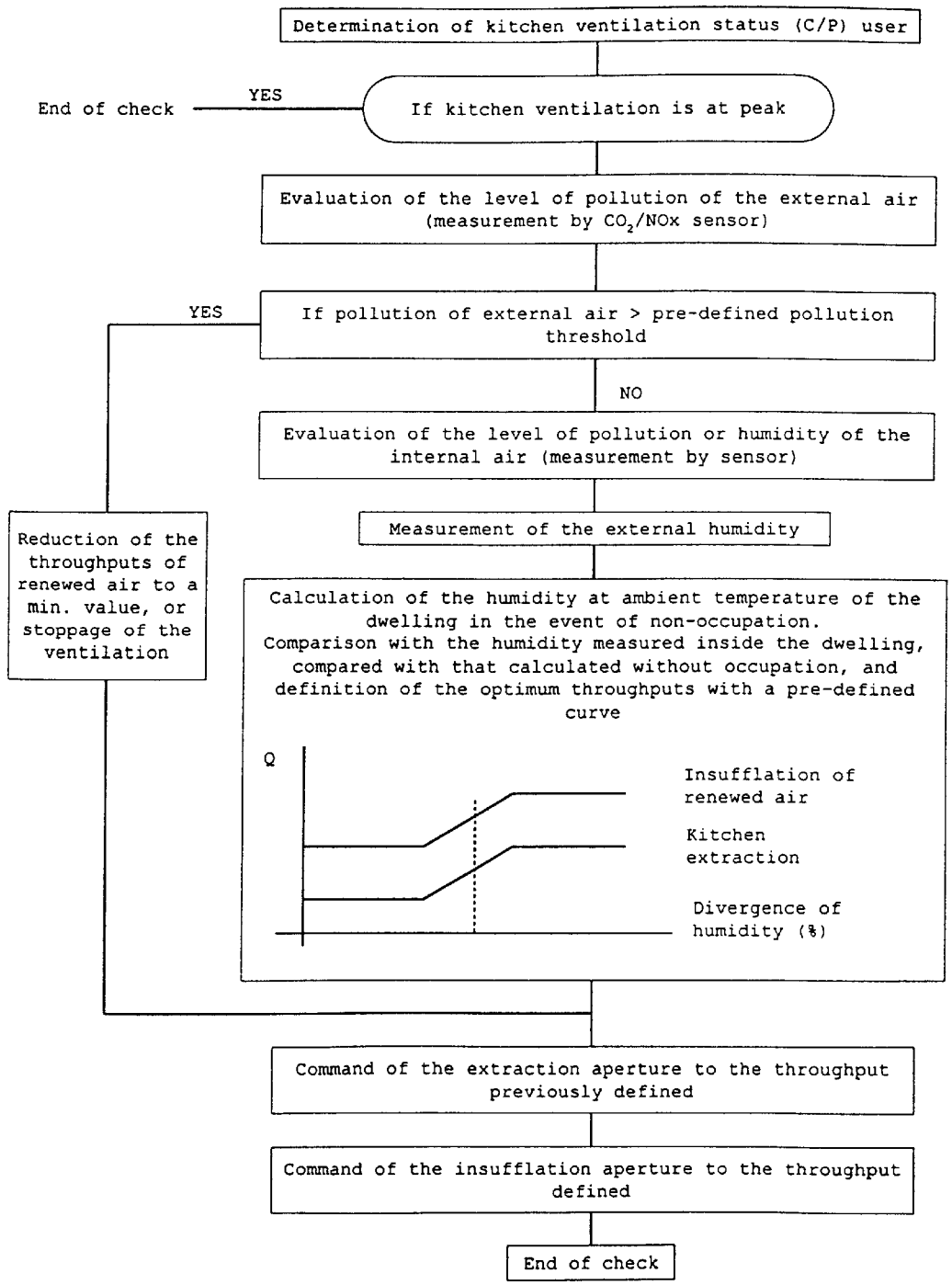
Figure 8K:
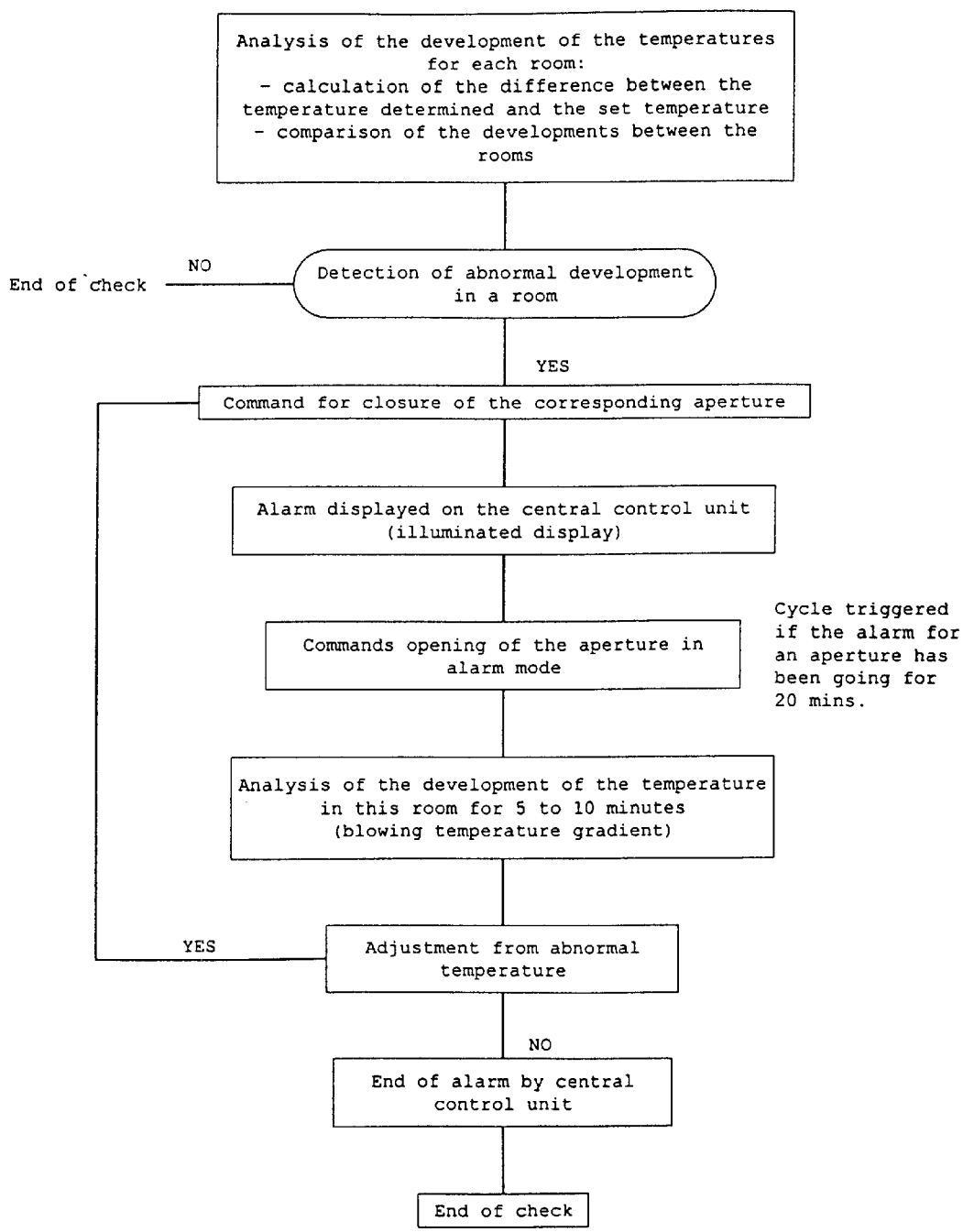

According to FIGS. 6a, 6b, the extraction aperture 11a shown is designed to obtain two extraction throughputs, i.e. a fixed, regular throughput, and a peak throughput which can be modulated.

For this purpose, the regular pipe 39 accommodates a module 41, for regulation of the regular throughput. On the other hand, the peak pipe 40 incorporates a motorised shutter 42, which is controlled by the switch 16, and consists in a known manner of a curved flexible blade 43, which is connected to the rotary shaft of a motor 44, which can permit inflection of the curvature of this blade, and thus provide the cross-section of passage of the peak pipe 40, between two stop positions corresponding to:

- minimal inflection of the blade 43, in which the latter closes the peak pipe 40; and
- maximal inflection of the blade, defined by a stop such as a, b, c, according to the type of apartment concerned.

By way of example, hereinafter there is provided a table of throughputs of extraction of an aperture of this type, and the regulation stop position for various types of dwellings:

| DWELLING | T1 | T2 | T3 | T4 | T5 and over |
|---|---|---|---|---|---|
| KITCHEN EXTRACTION | | | | | |
| Regular throughput | 20 | 30 | 45 | 45 | 45 |
| Motorised shutter throughput (less than 80 Pa) | 55 | 60 | 60 | 75 | 90 |
| Regulation position | a | a | a | b | c |

According to FIGS. 7a and 7b, the extraction aperture 11a shown is additionally designed to permit modulation of the regular throughput, according to the pollution in the dwelling.

For this purpose, the peak pipe 40 contains a motorised shutter 42 similar to that previously described.

The regular pipe 39 in turn contains a motorised shutter 45 which is similar to the shutter 42, and is actuated by means of a step-by-step motor 46, the said motorised shutter 45 being designed to be controlled by a sensor or detector according to the occupation (humidity, carbon dioxide etc.), and is associated with a stop 47 which determines the minimal throughput (of approximately 15 m$^3$ with 100 Pa)

In addition, according to this variant, two types of functioning of the shutter 45 of the regular pipe 39 can be envisaged, i.e.:

- either positioning of the shutter 45 which can be modulated according to the pollution of the premises; or
- all-or-nothing functioning, with times of closure and opening controlled by a sensor to measure the pollution in the premises.

It should also be noted that the extraction aperture systems as previously described can also be used to create the insufflation apertures 21.

The installation according to the invention additionally comprises a central unit 48, already referred to, for control of the functioning of this installation as a whole. For this purpose, this central control unit 48 comprises a plurality of intakes, and, on the basis of the various parameters supplied to these intakes, makes it possible to regulate the various outlets with which it is provided.

According to the invention, the various intakes are connected respectively to:

the temperature sensors 33, 38 of the various blower apertures 5, 6, 7;

optionally a pollution sensor, if it is wished to optimise throughputs of renewed air;

sensors to measure the temperature of the air blown at the outlet of each internal unit 1;

an external temperature sensor;

a thermostat 49, to measure the temperature of the air taken up; and sensors to measure the speed of the air blown at the outlet of the external units 1, which are designed to verify the throughput of air obtained.

In addition, an intake makes it possible to choose either a ventilation mode selected by the user, or an automatic functioning mode.

At the level of the outlets, this central control unit 48 is connected to:

the means for motorisation of the motorised shutters 23 of each blower aperture 5, 6, 7;

the insufflation apertures 21 of the internal units 1;

the switch 16 to control the extraction aperture 11a of the kitchen 15;

the fans of the internal units 1;

the means (not shown) for regulation of the power of the internal units 1; and convectors, not shown, which are disposed in the technical rooms.

A central control unit of this type is programmed to provide the following functions:

1) Daily or weekly programming, room by room

For this purpose, the user can define at least two set temperatures for each room, i.e.:

comfort temperature;

reduced temperature.

He can then define, in hourly steps and for each room, the setting required daily or weekly:

anti-frost;

comfort;

reduced.

2) Thermal regulation room by room

According to the divergence between the required set temperature at an instant t, and the measurement obtained by the sensor 33, 38 disposed in each blower aperture 5, 6, 7 of each main room 8, 9, 10, to regulate and control:

the position of each motorised shutter 23 (open/closed);

to determine and control the speed of rotation of the fan of the internal unit 1, such as to establish the mixed throughput, either:
according to the data transmitted by a speed or pressure sensor; or
according to the position of each motorised shutter 23 (open/closed);

to regulate the power (hot or cold):
of the unit with variable power (for example the 3-way valve in the case of centralised production);
of the electric back-up batteries (proportional regulation by Triac).

The temperature of the air blown can also be regulated either:

according to the needs measured in the main rooms (divergence and development of the temperatures measured and of the set temperatures);

according to the external temperature (display of a gradient).

3) Control of renewal with renewed air (insufflation and extraction)

For this purpose, the central control unit 48 assures:

control of the extraction aperture 11a in the kitchen 15 (with two throughputs, i.e. fixed or modulated);

control of insufflation of renewed air in the main rooms 8, 9, 10 continuously and virtually constantly (in a global period of one hour), irrespective of the functioning mode (heating, air conditioning or mid-season), by means of sequential functioning:

in the living room, minimum insufflation of approximately 35 m$^3$ of renewed air per hour;

in the bedrooms/other rooms, approximately 20 m$^3$ of renewed air per hour.

In addition, when this central control unit 48 carries out a sequence which is designed to make up for the deficit of renewed air in some rooms, it adapts the power to be supplied in order to obtain a blowing temperature which is close to the set temperature of the rooms. Thus, discomfort is avoided, and the ambient temperature of the said room(s) is not disrupted.

This central control unit 48 also allows the user to trigger ventilation with a peak throughput (when cooking is taking place, etc.), for a timed duration, by means of the switch 16 located in the kitchen 15.

4) Control and optimisation of the throughputs of renewed air:

When the installation is equipped with one or a plurality of sensors (inside and outside the dwelling) for measuring the pollution of the air (measurement of levels of $CO_2$, $H_2O$ etc.), in accordance with this information the central control unit 48 can then regulate the extraction and insufflation of renewed air. Thus, it adapts the renewal of air according to the needs measured in the dwelling. In addition, by measuring the external pollution, the unit 48 can temporarily reduce the supply of renewed air, if there is a pollution peak.

5) Control of renewal of air in the event of considerable smokiness or heavy occupation of the living room:

The central control unit 48 proposes to the user a "Smoky—Heavy occupation" cycle (described in greater detail hereinafter), which makes it possible to minimise the transfer of pollution from the living room 10 towards the bedrooms 8, 9, and to assure a substantial throughput of renewed air insufflated in the living room 10.

6) Confinement position:

In a housing block, in structural locations where there is a risk (close to a chemical factory, etc.), in the event of an alert, the central control unit 48 stops extraction and insufflation of renewed air.

7) Regulation and programming of the convectors installed in the service rooms.

8) When there is detection of an external temperature which is lower than the internal temperature, the regulation module triggers the peak throughput (extraction, insufflation), in order to cool the dwelling.

9) Control of the development of the temperatures in each room:

This function "Control and automatic thermal control of the rooms or premises" should make it possible to detect and avert two phenomena, i.e.:

opening of a window during the period of heating or air conditioning (loss of energy, and unnecessary electrical consumption);

dysfunctioning of a motorised blower aperture.

This function consists of analysing the development of the temperatures in each room, in relation to the respective set temperatures. If the central control unit 48 detects an abnormal variation of temperature in a room (opening of a window for example), and the temperature is stable in the other rooms, it forces closure of the shutter 23 of the corresponding blower aperture 5, 6, 7, such as to avoid losses of energy through the window. In addition, a notice appears on the display of the central control unit 48 ("Alarm" function).

In addition, in this hypothesis, and at a regular time interval (10 to 20 minutes), the central control unit 48 attempts once more to reach the required set temperature. It then checks whether the temperature increase makes it possible to achieve this set temperature or not. If not, it triggers the "Alarm" cycle once more.

The algorithm of functioning of an installation of this type is shown in FIGS. 8*a* to 8*k*.

An example of installation according to the invention is described hereinafter with reference to a dwelling of type 3, such as shown in FIG. 3.

Blower Apertures in the Main Rooms:

Mixing of the air at 5 vol/h=>dimensions of the apertures suitable for 2.5 ms.

|  | Blower aperture | Q blown (5 vol/h) |
|---|---|---|
| Living room | 500 × 100 | 220 |
| Bedroom 1 | 300 × 100 | 140 |
| Bedroom 2 | 300 × 100 | 140 |

| EXTRACTION | | |
|---|---|---|
| Regular | | |
| Kitchen | 45 m³/h | |
| Bathroom | 30 m³/h | 90 m³/h |
| WC | 15 m³/h | |
| Peak | | |
| Kitchen | 105 m³/h | |
| Bathroom | 30 m³/h | 150 m³/h |
| WC | 15 m³/h | |

The central control unit 48 must assure minimum throughputs of insufflation of renewed air in the main rooms 5, 6, 7, which are comparable to those of a conventional air intake (in a total period of one hour).

| INSUFFLATION OF RENEWED AIR | | |
|---|---|---|
|  | Surface area | Min Q renewed air |
| Living room | 17 m² | 35 m³/h |
| Bedroom 1 | 11 m² | 20 m³/h |
| Bedroom 2 | 11 m² | 20 m³/h |

DESCRIPTION OF THE PROCESS OF RENEWAL OF AIR

With a Regular Ventilation Throughput 90 m³/h is extracted. During take up by the internal unit 1, the main insufflation aperture 21 is in the automatically regulated position 75 m³/h (the missing 15 m³/h are introduced by the permeability of the dwelling).

If All the Blower Apertures 5, 6, 7 are in Demand (Heating/Cooling), They are Open The internal unit mixes approximately 500 m³/h (5 vol/h of the main rooms).

The renewed air is mixed with the recycled air (renewed air 75 m³/h—recycled air 425 m³/h).

The renewed air is distributed prorata with the dimensions of the blower apertures, i.e.:

|  | Blower aperture | Q blown | Renewed air |
|---|---|---|---|
| Living room | 500 × 100 | 220 m³/h | Of which 33 m³/h Ren. air |
| Bedroom 1 | 300 × 100 | 140 m³/h | Of which 21 m³/h Ren. air |
| Bedroom 2 | 300 × 100 | 140 m³/h | Of which 21 m³/h Ren. air |

The dimensions of the blower apertures are suitable for 2–2.5 m/s. The ranges are then adapted to the room to be treated. Sweeping of the room by the air (mixture of renewed air/recycled air) is then fully assured.

The central regulation unit 48 adapts the power of the unit (heating or cooling) according to the temperatures detected in the rooms, and the temperatures set (P-PD or PID regulation).

If no Blower Apertures 5, 6, 7 are in Demand, They are Then Closed

Only the slot 19 then continues to be operational. The throughput of the internal unit 1 is then reduced to approximately 200 m³/h, of which 75 m³/h is renewed air. The dimensions of the slots 29 are such as to obtain at the output a speed of 3 to 3.5 m/s. Thus, the ranges are maintained, and correct sweeping of the room by the renewed air is sustained. The slot 29, which is equipped with an automatically adjustable unit 30, assures the supply of, and distributes the renewed air (plenum under a pressure of approximately 20 Pa).

|  | Blower aperture | Q blown | Renewed air |
|---|---|---|---|
| Living room | 500 × 100 | 100 m³/h | Of which 37 m³/h is Ren. air |
| Bedroom 1 | 300 × 100 | 50 m³/h | Of which 19 m³/h is Ren. air |
| Bedroom 2 | 300 × 100 | 50 m³/h | Of which 19 m³/h is Ren. air |

The central control unit 48 adapts the variable power, in order to blow the mixed air at a temperature close to the set temperature of the rooms (such as to avoid changing the set temperature and creating discomfort).

If One or More Blower Apertures 5, 6, 7 are Closed and the Others are in Demand, the Functioning is Sequential.

"Room in Demand" Sequence:

The central control unit 48 adapts the throughput mixed by the internal unit 1 according to the number of apertures (and their size) which are in demand (and therefore open). For these rooms, a mixing throughput of 5 vol/h is maintained for air conditioning (4 vol/h for heating).

Example: Closed Aperture of a Bedroom

Throughput mixed by internal unit 1: 350 m³/h, of which 75 m³/h is renewed air.

The central control unit 48 regulates the variable power according to the temperatures measured in the rooms in demand and the required set temperatures (Proportional—Derivative regulation).

The blower apertures 5, 6, 7 have a low load loss (approximately 5–6 Pa), when their dimensions are 2–2.5 m/s. The slot 29 of the closed aperture (high load loss) therefore "recuperates" a very low leakage throughput (15 to 25 m³/h, of which 21% is renewed air), according to its dimensions.

"Recuperation of Renewed Air Deficit" Sequence:

If the aperture 5, 6, 7 of the room continues to be closed for a period of X minutes (estimated as 30 minutes), after this period, in order to recuperate the delay (the deficit) of renewed air in this room, the unit 48 then closes the apertures which were open, and opens the aperture which was closed. It calculates the deficit of renewed air, and optimises the duration of the sequence. In order to shorten the duration of the sequence, the high speed of insufflation (central insufflation aperture 135 m³/h) is triggered. The deficit is 8 m³, since 21 m³/h of renewed air should normally be introduced. The sequence will last for only 4 minutes. In order to avoid creating discomfort and modifying the temperature in the rooms, the central unit 48 regulates a blowing temperature which is close to the set temperature of the room(s) (or average set temperature), by regulation of the power of the unit. The heating/air-conditioning cycle then resumes its progress for the rooms in demand, by means of the "Room in demand" sequence.

Regulation and Optimisation of the Throughputs of Renewed Air:

The central control unit 48 can be equipped with a sensor which evaluates the level of pollution of the air of 20 the dwelling (according to the hygrometry, or level of $CO_2$ or the like), and adapts the renewal of renewed air necessary. Two types of control are envisaged:

All or Nothing Regulation: below a pollution threshold, the extraction aperture 11a of the kitchen 15 and the insufflation aperture 21 are controlled electrically, in order to decrease the throughputs (reduction from regular, example T3: normal regular kitchen extraction 45 m³/h, insufflation 75 m³/h).

In addition, when the regular level is reduced, the throughputs are reduced to a value which is close to: kitchen extraction 20 m³/h—insufflation 40 m³/h).

In addition, when the level of pollution is above the threshold, the unit 48 then controls the apertures in order to obtain the normal regular throughput.

Modulating regulation: the extraction aperture 11a of the kitchen 15 and the insufflation aperture 21 can be modulated in this case:

Kitchen extraction: modulation between 15 and 45 m³/h

Insufflation: modulation between 45 and 75 m³/h

According to the level of pollution detected by the sensor, the electronic module adapts the ventilation (level of renewed air) to the best level, for example by varying according to this level of pollution:

the throughput of air introduced, between 45 m³/h and 75 m³/h;

the throughput of air extracted from the kitchen, between 15 m³/h and 45 m³/h.

In addition, when the peak throughput is controlled by the switch 16 placed in the kitchen 15, the central unit 48 positions the insufflation and extraction apertures such as to obtain throughputs of:

150 m³/h in extraction 135 m³/h in insufflation.

The functioning is then defined as in the previous case, and the following throughputs are obtained:

1 All the apertures are open (in demand)

| Throughput mixed U1 | ≈500 m³/h | of which 135 m³/h is renewed air |
|---|---|---|
| Living room | 220 m³/h | of which 60 m³/h is renewed air |
| Bedroom 1 | 140 m³/h | of which 38 m³/h is renewed air |
| Bedroom 2 | 140 m³/h | of which 38 m³/h is renewed air |

The central module adapts the variable power according to the temperatures.

2 No aperture is in demand: shutter apertures closed

| Throughput mixed U1 | ≈200 m³/h | of which 135 m³/h is renewed air |
|---|---|---|
| Living room blowing (slot) | 100 m³/h | of which 71 m³/h is renewed air |
| Bedroom 1 blowing (slot) | 50 m³/h | of which 32 m³/h is renewed air |
| Bedroom 2 blowing (slot) | 50 m³/h | of which 32 m³/h is renewed air |

The central control unit 48 also regulates the blowing temperature (close to the set temperature of the rooms), by regulation of the power.

3) One or a plurality of closed apertures, and at least one in demand: sequential functioning Example: if an aperture 5, 6 of a bedroom 8, 9 is closed, the throughput mixed by the internal unit 1 is 350 m³/h, of which 135 m³/h is renewed air. The aperture which has remained closed for a period of X minutes (estimated as 30 minutes), and the central unit 48, then activate the sequence of "Renewed air deficit recuperation" (inverts the opening of the apertures), for a time calculated to introduce a sufficient quantity of renewed air (approximately 20 m³ in normal regular operation) into the room which was closed. In addition, the central unit 48 regulates the blowing temperature to close to the set temperature for the rooms.

4) Optimisation of the throughputs of renewed air:

In this case, the pollution sensor carries no weight in terms of peak throughput.

FUNCTIONING IN SMOKY/HEAVY OCCUPATION POSITION—LIVING ROOM

The system concerned is a centralised system. The recycled air is obtained from all of the main rooms 8, 9, 10 (collected unchannelled from the corridor). It is filtered, heated or conditioned. When the living room 10 is highly occupied (family meal, etc.), the purpose of the following functioning is to minimise the pollution of the other main rooms 8, 9, and to assure substantial ventilation of the living room 10, during these periods in which there is a high level of occupation or smokiness.

For this purpose, when the central unit 48 is informed of the "Smoky-living room" position, it commands peak throughput ventilation (kitchen extraction 150 m³/h—insufflation 135 m³/h). The "Smoky" mode is also triggered automatically for a maximum duration of 2 hours.

In order to avoid transporting the pollution from the living room to the bedrooms 8, 9, the principle (based on sequential functioning) consists of not blowing into the living room 10 and the bedrooms 8, 9 at the same time. Blowing therefore takes place as a matter of priority into the living room 10, the apertures 5, 6 of the bedrooms 8, 9 being closed.

The "Smoky" sequential function is characterised by:

"Living room" sequence: aperture 7 of the living room 10 open and apertures 5, 6 of the bedrooms 8, 9 closed;

"Bedrooms" sequence: aperture 7 of the living room 10 closed and apertures 5, 6 of the bedrooms 8, 9 open.

In addition, when no aperture is in demand (mid-season: no air conditioning), the cycle begins with the "Living room" sequence: the motorised shutters 23 of the bedrooms 8, 9 close, and the aperture 7 of the living room 10 opens. The central unit 48 determines the speed of rotation of the fan of the internal unit 1, such as to assure a mixed throughput in the living room 10 (approximately 4 vol/h).

The following throughputs are thus obtained:

throughput mixed by the internal unit 48: approximately 220 m$^3$/h, of which 135 m$^3$/h is renewed air;

living room: quantity blown approximately 180 m$^3$/h, of which 110 m$^3$/h is renewed air;

bedroom 1 (shutter closed): quantity blown (slot) approximately 20 m$^3$/h, of which 13 m$^3$/h is renewed air;

bedroom 2 (shutter closed): quantity blown (slot) approximately 20 m$^3$/h, of which 13 m$^3$/h is renewed air.

Thus, in the living room 10, the throughput of renewed air is substantial, which assures good quality of the air, even in the event of high occupation. On the other hand, in the bedrooms 8, 9, the level of air recycled is very low (13 m$^3$/h of renewed air for 20 m$^3$/h blown), which prevents the pollution from being transported.

After 30 minutes, the central unit 48 activates the "bedroom" sequence, i.e. it closes the living room 10, and opens the bedrooms 8, 9.

The calculation of the deficit of renewed air and the duration of this sequence is as follows: throughput of renewed air introduced into the rooms of which the apertures are closed: 20 m$^3$/h–13 m$^3$/h=7 m$^3$/h: i.e. after 30 minutes, a deficit of 3.5 m$^3$ of renewed air per bedroom×2 bedrooms, i.e. 7 m$^3$ of renewed air, and therefore with an insufflated throughput of renewed air of 135 m$^3$/h, duration of the "bedroom" sequence of approximately 3 minutes.

By means of this sequential functioning, the central unit 48 makes up for the deficit of renewed air in the bedrooms 8, 9, in order to obtain globally in one hour 20 m$^3$ of renewed air per bedroom (comparable with an air intake on a conventional facade).

When in the Heating/Cooling Position

When the "Smoky" cycle is triggered, the air conditioning in the bedrooms 8, 9 is no longer assured 100% (timed duration of 2 hours), and the central unit 48 triggers the "living room" sequence (apertures 5, 6 of the bedrooms 8, 9 closed (slot 29 leakage throughput) and aperture 7 of the living room 10 open);

The following throughputs are obtained;

| Living room | 220 m$^3$/h | of which 110 m$^3$/h is ren. air |
| Bedroom 1 | 20 m$^3$/h | of which 13 m$^3$/h is ren. air |
| Bedroom 2 | 20 m$^3$/h | of which 13 m$^3$/h is ren. air |

The central unit 48 regulates the power in order to maintain the required set temperature in the living room 10.

After an hour of the "Smoky" cycle, the central unit 10 activates the "bedroom" sequence (inverts the opening of the apertures), in order to make up for the deficit of renewed air in the said bedrooms.

The throughputs of renewed air introduced into the bedrooms 8, 9 with the shutters closed are then 13 m$^3$/h.

Thus in order to obtain a global throughput of renewed air of 20 m$^3$/h, the apertures 5, 6 of the bedrooms 8, 9 must remain open for: ((7×2)/135)×60≈6 minutes.

During this sequence, in accordance with the temperatures measured in the bedrooms 8, 9, the central unit 48 regulates the temperature of the air blown to the lowest possible level, in order to freshen the said bedrooms.

The "Smoky" cycle then resumes its operative sequence "living room 10 open and bedrooms 8, 9, closed" for the remaining hour (total maximum duration 2 hours).

At the end of the "Smoky" cycle, the air-conditioning functioning resumes, and the temperatures of the bedrooms 8, 9 are once more regulated in accordance with the set levels.

In addition, in winter, ventilation of the living room 10 is authorised as a matter of priority (alternance of the sequences), and a maximum temperature drop of 2° C. relative to the set levels is allowed in the bedrooms 8, 9. The "Smoky" cycle begins with the "living room" sequence (aperture 7 of the living room 10 open, apertures 5, 6 of the bedrooms 8, 9 closed), with a peak ventilation throughput (extraction 150 m$^3$/h, insufflation 135 m$^3$/h).

In addition, if no bedroom 8, 9 needs to be heated (room temperature at the most 2° C. lower than the set temperature), the "Smoky" living room sequence continues for a maximum period Y (estimated as 30 minutes).

The "bedrooms" sequence is then triggered (aperture 7 of living room 10 closed, apertures 5, 6 of bedrooms 8, 9 open), either for an excessively low temperature in a bedroom, or for the maximum duration of 30 minutes. The duration of this sequence is determined in order to recuperate the deficit of renewed air in the bedrooms 8, 9, and to restore the temperature of the said bedrooms to the set level.

In addition, the central unit 48 regulates the throughput blown (5 vol/h maximum) and the power of the internal unit 1, such as to reach the set temperatures of the bedrooms 8, 9 as quickly as possible (maximum blowing temperature approximately 45° C.), in order for the duration of the "bedrooms" sequence to be as short as possible.

What is claimed is:

1. A method for heating and/or air conditioning of premises, comprising at least one service room (15), and at least two main rooms (8,9,10), consisting of:

using an external unit (50; 51) and at least one internal unit (1), the external unit (50; 51) comprising means for regulation with variable power and an exchanger, and each internal unit (1) comprising an air take-up unit (2), means for ventilation with a variable throughput and power and an exchanger, and being designed to assure the heating and/or air conditioning of at least two main rooms (8,9,10);

discharging a given volume of stagnant air;

conveying a given volume of renewed air to the air take-up units (2) of each internal unit (1);

mixing the renewed air and the air taken up in each internal unit (1), upstream from the exchanger of the latter;

blowing the mixture of renewed air/heated and/or cooled air taken up, into each main room (8,9,10), through at least one blower aperture (5,6,7) which is supplied by an internal unit (1), and each of which is associated with means for motorisation, which can make it possible to modify the position of opening of the said apertures; and regulating the temperature in each main room (8,9,10), by means of temperature measurement means (33; 38), with which the means for motorisation of the blower apertures (5,6,7) are associated, such as to obtain positioning of each of these apertures which can make it possible to maintain each of the said main rooms at a pre-determined set temperature, the said method being wherein a central control unit (48) is used, which is connected to the external (50; 51) and internal unit(s) (1), the means for motorisation of each blower aperture (5,6,7), and the means for measurement of the temperature (33; 38), and is programmed to be configured:

either in a mode for control of the temperatures of the rooms (8,9,10), during which:

it controls the external (50; 51) and internal unit(s) (1) and the means for motorisation of the blower apertures (5,6,7), according to the information received from the means for measurement of the temperature (33; 38), such as to maintain the set temperature in each main room (8,9,10);

it determines the position of the means for motorisation of each blower aperture (5,6,7), such as to detect any total closure of the (or all of the) aperture(s) which supply/supplies a main room (8,9,10);

and, if all the apertures (5, and/or 6, and/or 7) which supply at least one main room (8, and/or 9, and/or 10) are closed, it is configured in a mode for control of renewed air, during which:

it measures the time of closure of the said aperture(s) (5,6,7) closed;

after a time of closure of the said aperture(s), which is greater than a pre-determined threshold, it calculates the deficit in the supply of renewed air in each room (8,9,10) not supplied, and controls the means for motorisation of all the blower apertures (5,6,7), such as to open each blower aperture initially closed, and to close the blower apertures initially opened of the rooms, for a period of time which is designed to make up for the deficit in the supply of renewed air in each room not initially supplied; and it is reconfigured in the temperature control mode in the main rooms, when the deficit in the supply of renewed air has been made up.

2. A method for heating and/or air conditioning as claimed in claim 1, wherein in its renewed air control configuration, the main control unit (48) controls the external unit (50; 51) and/or the internal unit(s) (1) such that the temperature of the blown air mixed is close to the set temperature of each main room (8,9,10) initially closed.

3. A method for heating and/or air conditioning as claimed in claim 1, wherein:

use is made of blower apertures (5,6,7) provided with a main blower pipe (22), comprising a closing shutter (23) controlled by means for motorisation, and an additional pipe (29) with a reduced cross-section; and in the configuration for controlling the temperature of the main rooms (8,9,10), of the main control unit (48), and on the assumption that all the blower apertures (8,9,10) are closed, air is distributed equally in all the main rooms (5,6,7), by means of the additional pipes (29) of the blower apertures (5,6,7).

4. A method for heating and/or air conditioning as claimed in claim 3, wherein when all the blower apertures (5,6,7) are closed, the main control unit (48) controls the means for ventilation of each internal unit (1), such that the latter provide a minimal throughput of mixture of renewed/air taken up, by means of the additional pipe (29) of the blower apertures (5,6,7).

5. A method for heating and/or air conditioning as claimed in claim 3, wherein when all the blower apertures (5,6,7) are closed, the central control unit (1) controls the external unit (50; 51) and/or the internal unit(s) (1), such that the temperature of the mixed air blown is close to the set temperature of the main rooms (8,9,10).

6. A method for heating and/or air conditioning as claimed in claim 3, wherein each additional pipe (29) of each blower aperture (5,6,7) is equipped with an automatically adjustable modulator (30), which can supply the same throughput of mixed air for a given range of pressures.

7. A method for heating and/or air conditioning as claimed in claim 3, wherein each slot (29) of the blower apertures (5,6,7) contains a shutter (52), which is articulated around a transverse axis, and can oscillate freely from a position of total or partial closure of the said slot (29), towards a position of total opening of the said slot, according to the air pressure upstream from the latter.

8. A method for heating and/or air conditioning as claimed in claim 3, wherein each blower aperture (5,6,7) is equipped with a temperature sensor (33; 38), which acts as a means for measuring the temperature, is pre-assembled to the said blower aperture, and is disposed such as to be swept by the ambient air of the room.

9. A method for heating and/or air conditioning as claimed in claim 1, wherein stagnant air is extracted from the service rooms (15) by means of extraction apertures (11a, 11b, 11c) which are connected to pipes (13,14) in which low pressure is created by a fan (12).

10. A method for heating and/or air conditioning as claimed in claim 9, wherein at least one of the service rooms (15) is equipped with an extraction aperture (11a) provided with a manually-controlled throughput modulator (42).

11. A method for heating and/or air conditioning as claimed in claim 10 taken together, wherein, in the air-conditioning mode, the central control unit (48) is programmed to command extraction and insufflation of the maximal throughput of stagnant and renewed air, when the external temperature becomes lower than the set temperatures.

12. A method for heating and/or air conditioning as claimed in claim 1, wherein the renewed air is introduced into the premises by means of a pipe (19) which is provided with a fan (17), and in that this renewed air is supplied to each internal unit (1) by means of pipes (20), each of which comprises an insufflation aperture (21) with a throughput which can be modulated, thus making it possible to adapt the throughput of renewed air according to the throughput of air extracted.

13. A method for heating and/or air conditioning as claimed in claim 12 taken together, wherein the central control unit (48) is connected to each extraction aperture (11a) with a throughput which can be modulated and to each aperture (21) for insufflation of renewed air, and is programmed to adjust the throughput of the said insufflation apertures such as to adapt the throughput of renewed air according to the throughput of air extracted.

14. A method for heating and/or air conditioning as claimed in claim 13, wherein the intake of the pipe for supplying renewed air is equipped with a filtering system, according to the ambient external pollution.

15. A method for heating and/or air conditioning as exclaimed in claim 14, wherein the central control unit (48) is programmed to limit the throughput of renewed air to a minimal value, if the external pollution becomes higher than the internal pollution.

16. A method for heating and/or air conditioning as claimed in claim 1, wherein:
  there is provided in the premises at least one sensor to measure the quality of the air in the said premises, such as in particular a humidity sensor, a carbon dioxide sensor, etc.;
  the device is equipped with an external sensor to measure values corresponding to those of an internal sensor, i.e. in particular a humidity sensor, a carbon dioxide sensor, etc.;
  the general control system is connected to each measuring sensor and to the external sensor, and the latter is programmed such as to optimise the throughput of renewed air which is actually necessary for the premises.

17. A method for heating and/or air conditioning as claimed in claim 16, wherein the premises are equipped with a single measuring sensor, the central control unit (48) being programmed, according to the information supplied by the said sensor, to regulate the throughput extracted and the throughput of renewed air insufflated.

18. A method for heating and/or air conditioning as claimed in claim 16, wherein:
  each blower aperture (5,6,7) is equipped with a measuring sensor; and
  the central control unit (48) is programmed such as to optimise the throughput of air extracted and the throughput of air insufflated at each internal unit (1), according to:
    the position of the closing shutter (23) of the blower aperture(s) (5,6,7) of each room (8,9,10); and
    the information supplied by each sensor in the room concerned, which is representative of its need for renewed air.

19. A method for heating and/or air conditioning as claimed in claim 1, wherein the Central control unit (48) is designed to be able to be positioned in a control mode which is known as "smoky", or "high level of occupation of one of the main rooms (10), known as the "living room"", during which:
  it is initially configured in a sequence known as "living room";
    at the beginning of which it commands opening of the blower aperture(s) (7) of the living room (10), and closure of the blower apertures (5,6) of all the other main rooms (8,9);
    it calculates a given maximal mixing throughput in the living room (10), and controls the unit (1) of the said living room such as to obtain this level of mixing;
    it adapts the thermal power supplied by the internal unit (1), such as to obtain the set temperature in the living room (10);
  after a pre-determined period of time, it is configured in a sequence known as "bedrooms", in which:
    it commands closure of the blower aperture(s) (7) of the living room (10), and opening of the blower apertures (5,6) of the other main rooms (8,9) known as bedrooms;
    it calculates the deficit of renewed air in the bedrooms (8,9) during the living room sequence, and commands maintenance of this "bedroom" sequence for a period of time which is designed to make up for the said deficit of renewed air: and
    it is repositioned in its "living room" configuration, after this period of time has elapsed.

20. A method for heating and/or air conditioning as claimed in claim 19, taken together, wherein during the "smoky", or "high level of occupation of the living room" (10) control mode, the main control system (48) is programmed to position each extraction aperture (11a) and each insufflation aperture (21) in the maximal throughput mode.

21. A method for heat ad/or air conditioning as claimed in claim 20, wherein during the "smoky", or "high level of occupation of the living room" (10) control mode, the "bedrooms" sequence is triggered, either after the pre-determined period of time, or if the divergence between the actual temperature in one of the bedrooms (8,9) and the set temperature of the said bedroom becomes greater than a given value.

22. A method for heating and/or air conditioning as claimed in claim 1, wherein the central control unit (48) is programmed to analyse the development of the temperatures in each main room (8,9,10), relative to the respective set temperatures, in order to command closure of the blower aperture(s) (5,6,7) of one of the main rooms (8,9,10), in the event of abnormal variation of temperature in the said room, and in order to emit an alarm signal which is representative of this closure.

23. A method for heating and/or air conditioning as claimed in claim 1, wherein use is made of a heat exchanger (18) for renewed air/extracted air, which is designed to assure pre-heating or pre-cooling of the renewed air.

24. A method for heating and/or air conditioning as claimed in claim 1, wherein the central control unit (48) comprises manual controls, which can allow the user to pre-define a plurality of functioning characteristics such as:
  definition of at least two types of set temperatures for each main room (8,9,10), such as comfort temperature or reduced temperature; and
  definition daily or weekly, and in hourly steps, of the set temperature for each main room (8,9,10), such as anti-frost temperature, comfort temperature, reduced temperature etc.

25. A method for heating and/or air conditioning as claimed in claim 1, intended for heating and/or air conditioning of several premises such as housing blocks, offices, lodging rooms, etc., wherein it comprises at least one internal unit (1), a central control unit (48) for each of the premises, and a centralised external unit (51) for the premises as a whole.

26. A method for heating and/or air conditioning as claimed in claim 1, intended for heating and/or air conditioning of several premises such as housing blocks, offices, lodging rooms, etc., wherein it comprises at least one internal unit (1), a central control unit (48), and an external unit (50) for each of the premises.

27. A device for heating and/or air conditioning of premises containing at least one service room (15), and at least two main rooms (8,9,10), comprising:
  an external unit (50; 51) and at least one internal unit (1), the external unit (50; 51) comprising means for regulation with variable power and an exchanger, and each internal unit (1) comprising an air take-up unit (2), means for ventilation with a variable throughput and power and an exchanger, and being designed to assure heating and/or air conditioning of at least two main rooms (8,9,10);

means (11*a*, 11*b*, 11*c*, 12, 13, 14) for discharge of stagnant air;

means (17,21) for introduction of renewed air at the take-up units (2) of each internal unit (1);

means (2) for mixture of renewed air/air taken up in each internal unit (1), upstream from the exchanger of the latter;

means (5,6,7) for blowing the mixture of renewed air/air taken up present in each main room (8,9,10), in one or more blower apertures (5,6,7) which are supplied by at least one internal unit (1), and each of which is associated with means for motorisation which can modify the position of opening of the said apertures; and means (33; 38) for measuring the temperature in each main room (8,9,10), with which there are associated the means for motorisation of the blower aperture(s) (5,6,7) of the said main room, and which are designed to make it possible to obtain a set temperature in the said room, the said device for heating and/or air conditioning being wherein it comprises a central control unit (48) which is connected to the external unit (50; 51), to each internal unit (1), and to the means for motorisation of the blower apertures (5,6,7), the said central control unit being programmed to:

either be configured in a mode for controlling the temperatures of the main rooms (8,9,10), during which:

it controls the external (50; 51) an internal unit(s) (1) and the means for motorisation of the blower apertures (5,6,7), according to the information received from the means (33; 38) for measuring the temperature, such as to maintain the set temperature in each main room (8,9,10); and it detects the position of the means for motorisation of each blower aperture (5,6,7), such as to detect any total closure of the (or all the) blower(s) which supply a main room (8,9,10);

or, on the assumption that all the apertures (5, and/or 6, and/or 7) which supply at least one main room (8, and/or 9, and/or 10) are closed, it is configured in a mode for control of renewed air, during which:

it measures the time of closure of the said closed aperture(s) (5,6,7);

beyond a time of closure of the said aperture(s) (5,6,7) which is greater than a pre-determined threshold, it calculates the deficit in the supply of renewed air in each room (8,9,10) which is not supplied, and controls the means for motorisation of all the blower apertures (5,6,7), such as to open each blower aperture (5,6,7) initially closed, and to close the blower apertures (5,6,7) initially opened of the other rooms, for a period of time which is designed to make up the deficit in renewed air supplied in each room not initially supplied; and it is reconfigured in a temperature control mode in the main rooms (8,9,10), when the deficit in the supply of renewed air has been made up.

28. A device for heating and/or air conditioning as claimed in claim 27, wherein, in its renewed air control configuration, the central control unit (48) is programmed to control the external unit (50; 51) and/or the internal unit(s) (1), such that the temperature of the mixed air blown is close to the set temperature of each room (8,9,10) initially closed.

29. A device for heating and/or air conditioning as claimed in claim 27, wherein:

each blower aperture (5,6,7) comprises a main blower pipe (22), containing a closing shutter (23) which is controlled by means for motorisation, and an additional pipe (29) with a reduced cross-section;

in its configuration for controlling the temperature, and on the assumption that all the blower apertures (5,6,7) are closed, the central control unit (48) is programmed to assure equal distribution of the air in all the rooms (8,9,10), by means of the additional pipes (29) of the blower apertures (5,6,7).

30. A device for heating and/or air conditioning as claimed in claim 29, wherein the means for motorisation of the blower apertures (5,6,7) are designed to position the closing shutters (23) in two positions, corresponding either to total closure, or to total or partial opening of the main pipes (22) of the said apertures.

31. A device for heating and/or air conditioning as claimed in claim 29, wherein the additional pipe (29) of each blower aperture (5,6,7) is equipped with an automatically adjustable modulator (30), which can make it possible to supply the same throughput of air for a given range of pressures.

32. A device for heating and/or air conditioning as claimed in claim 29, wherein in each slot (29) of the blower apertures (5,6,7), there is integrated a flap (52) which is articulated around a transverse axis, and can oscillate freely from a position of total or partial closure of the said slot (29), towards a position of total opening of the said slot, according to the air pressure upstream from the latter.

33. A device for heating and/or air conditioning as claimed in claim 27, wherein each blower aperture (5,6,7) is equipped with a temperature sensor (33; 38), pre-assembled to the said aperture, which acts as a means for measuring the temperature, and is disposed such as to be swept by the ambient air of the room, when the said blower aperture has been installed.

34. A device for heating and/or air conditioning as claimed in claim 27, wherein, for each service room (15), the air extraction means comprise an extraction aperture (11*a*, 11*b*,11*c*) which is connected to a main pipe (13,14), in which low pressure is created by means of a fan (12).

35. A device for heating and/or air conditioning as claimed in claim 34, wherein at least one extraction, aperture (11*a*) is equipped with a manually-controlled throughput modulator (41).

36. A device for heating and/or air conditioning as claimed in claim 27, wherein the means for introduction of renewed air comprise a pipe (19) which is provided with a fan (17), which is designed to supply this renewed air to each internal unit (1), at the level of an insufflation aperture (21) with a throughput which can be modulated, thus making it possible to adapt the throughput of renewed air to the throughput of air extracted.

37. A device for heating and/or air conditioning as claimed in claim 36 taken together, wherein the central control unit (48) is connected to each extraction aperture with a throughput which can be modulated (11*a*), and to each aperture (21) for insufflation of renewed air, and is programmed to adjust the throughput of the said insufflation apertures, such as to adapt the throughput of renewed air according to the throughput of air extracted.

38. A device for heating and/or air conditioning as claimed in claim 37, wherein it comprises a filtering system which is integrated in the pipe (19) for supply of renewed air, according to the ambient external pollution.

39. A device for heating and/or air conditioning as claimed in claim 27, wherein it comprises:
- at least one sensor to measure the quality of the air in the premises, such as in particular a humidity sensor, a carbon dioxide sensor, etc.;
- an external pollution sensor to measure values corresponding to those of an internal sensor, i.e. a humidity sensor, a carbon dioxide sensor, etc.;
- the general central control unit being connected to the various internal and external sensors, and being programmed to optimise the throughput of renewed air which is actually necessary.

40. A device for heating and/or air conditioning as claimed in claim 39, wherein it comprises a single internal measuring sensor, the central control unit (48) being programmed to regulate the throughput of air extracted and the throughput of renewed air, according to the information supplied by the said sensor.

41. A device for heating and/or air conditioning as claimed in claim 39, wherein:
- each blower aperture (5,6,7) is equipped with a measuring sensor;
- the central control unit (48) is programmed such as to optimise the throughput of air extracted and the throughput of renewed air at each internal unit (1), according to:
  - the position of the closing shutter (23) of the blower aperture(s) (5,6,7) of each room (8,9,10); and
  - the information supplied by each sensor, which is representative of the level of pollution or occupation of the room concerned, and therefore its need for renewed air.

42. A device for heating and/or air conditioning as claimed in claim 27, wherein the central control unit (48) is designed to be able to be positioned in a control mode which is known as "smoky", or "high level of occupation of one of the main rooms (10)", known as the "living room", during which:
- it is initially configured in a sequence known as "living room", at the beginning of which it commands opening of the blower aperture(s) (7) of the living room (10), and closure of the blower apertures (5,6) of all the other main rooms;
- it calculates a given maximal mixing throughput in the living room (10), and controls the unit (1) of the said living room such as to obtain this level of mixing;
- it adapts the thermal power supplied by the internal unit (1), such as to obtain the set temperature in the living room (10);
- after a pre-determined period of time, it is configured in a sequence known as "bedrooms", in which:
  - it commands closure of the blower aperture(s) (7) of the living room (10), and opening of the blower apertures of the other main rooms (8,9) known as bedrooms;
  - it calculates the deficit of renewed air in the bedrooms (8,9) during the living room sequence, and commands maintenance of this "bedroom" sequence for a period of time which is designed to make up for the said deficit of renewed air; and
  - it is repositioned in its "living room" configuration, after this period of time has elapsed.

43. A device for heating and/or air conditioning as claimed in claim 27, wherein the central control unit is programmed to analyse the development of the temperatures in each main room (8,9,10), relative to the respective set temperatures, in order to command closure of the blower aperture(s) (5,6,7) of one of the main rooms (8,9,10), in the event of abnormal variation of temperature in the said room, and in order to emit an alarm signal which is representative of this closure.

44. A device for heating and/or air conditioning as claimed in claim 27, comprising a heat exchanger for renewed air/extracted air (18), which is designed to assure pre-heating and/or pre-cooling of the said renewed air.

45. A device for heating and/or air conditioning as claimed in claim 27, wherein the central control unit (48) comprises manual controls, which can allow the user to pre-define a plurality of functioning characteristics such as:
- definition of at least two types of set temperatures for each main room (8,9,10), such as comfort temperature or reduced temperature; and
- definition daily or weekly, and in hourly steps, of the set temperature for each main room (8,9,10), such as anti-frost temperature, comfort temperature, reduced temperature etc.

46. A device for heating and/or air conditioning as claimed in claim 27, intended for heating and/or air conditioning of several premises such as housing blocks, offices, lodging rooms, etc., wherein it comprises at least one internal unit (1), a central control unit (48) for each of the premises, and a centralised external unit (51) for the premises as a whole.

47. A device for heating and/or air conditioning as claimed in claim 27, intended for heating and/or air conditioning of several premises such as housing blocks, offices, lodging rooms, etc., wherein it comprises at least one internal unit (1), a central control unit (48), and an external unit (50) for each of the premises.

* * * * *